US012758992B2

(12) United States Patent
Kocer

(10) Patent No.: US 12,758,992 B2
(45) Date of Patent: Oct. 13, 2026

(54) ELECTROSTATIC SPRAYING SYSTEM AND METHODS FOR SAME

(71) Applicant: Raven Industries, Inc., Sioux Falls, SD (US)

(72) Inventor: Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 18/749,866

(22) Filed: Jun. 21, 2024

(65) Prior Publication Data

US 2024/0424506 A1 Dec. 26, 2024

Related U.S. Application Data

(60) Provisional application No. 63/509,711, filed on Jun. 22, 2023.

(51) Int. Cl.
*B05B 5/08* (2006.01)
*A01C 21/00* (2006.01)
(Continued)

(52) U.S. Cl.
CPC .............. *B05B 5/085* (2013.01); *A01C 21/00* (2013.01); *A01C 23/007* (2013.01);
(Continued)

(58) Field of Classification Search
CPC ..... B05B 5/085; B05B 5/0255; B05B 12/008; B05B 12/082; B05B 12/085; A01C 21/00;
(Continued)

(56) References Cited

U.S. PATENT DOCUMENTS 1,582,986 A 5/1926 Frank
1,947,407 A 2/1934 Cornell, Jr.
(Continued)

FOREIGN PATENT DOCUMENTS

AU 725448 10/2000
AU 2004219715 9/2004
(Continued)

OTHER PUBLICATIONS

"Agrifac Pulse-width modulation (PWM) spraying", 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.
(Continued)

*Primary Examiner* — Steven M Sutherland
(74) *Attorney, Agent, or Firm* — Schwegman Lundberg & Woessner, P.A.

(57) ABSTRACT

An electrostatic nozzle system for agricultural spraying comprising at least one additive fluid source configured to contain an additive fluid and an electrostatic nozzle assembly in communication with the at least one additive fluid source. The electrostatic nozzle assembly includes an electrostatic charging element configured to electrostatically charge the additive fluid. An agricultural product source containing an agricultural product and an agricultural product nozzle assembly in communication with the agricultural product source, the agricultural product nozzle assembly configured to dispense the agricultural product from an agricultural product nozzle orifice.

37 Claims, 11 Drawing Sheets

(51) Int. Cl.
*A01C 23/00* (2006.01)
*A01C 23/04* (2006.01)
*B05B 5/025* (2006.01)
*B05B 12/00* (2018.01)
*B05B 12/08* (2006.01)

(52) U.S. Cl.
CPC .......... *A01C 23/047* (2013.01); *B05B 5/0255* (2013.01); *B05B 12/008* (2013.01); *B05B 12/082* (2013.01); *B05B 12/085* (2013.01)

(58) Field of Classification Search
CPC .. A01C 23/007; A01C 23/047; A01M 7/0092; A01M 7/0089
See application file for complete search history.

(56) References Cited

U.S. PATENT DOCUMENTS

| | | | |
|---|---|---|---|
| 3,197,299 | A | 7/1965 | Bosse et al. |
| 3,770,198 | A | 11/1973 | Mihara |
| 3,955,795 | A | 5/1976 | Neely |
| 4,283,010 | A | 8/1981 | Arzi et al. |
| 4,356,528 | A | 10/1982 | Coffee |
| 4,398,605 | A | 8/1983 | Conklin et al. |
| 4,530,463 | A | 7/1985 | Hiniker et al. |
| 4,582,085 | A | 4/1986 | Hafner et al. |
| 4,632,358 | A | 12/1986 | Orth et al. |
| 4,803,626 | A | 2/1989 | Bachman et al. |
| 4,970,973 | A | 11/1990 | Lyle et al. |
| 5,134,961 | A | 8/1992 | Giles et al. |
| 5,285,814 | A | 2/1994 | Pettersson et al. |
| 5,310,113 | A | 5/1994 | Cowgur |
| 5,337,959 | A | 8/1994 | Boyd |
| 5,475,614 | A | 12/1995 | Tofte et al. |
| 5,479,812 | A | 1/1996 | Juntunen et al. |
| 5,496,100 | A | 3/1996 | Schmid |
| 5,503,366 | A | 4/1996 | Zabeck et al. |
| 5,520,333 | A | 5/1996 | Tofte |
| 5,615,836 | A | 4/1997 | Graef |
| 5,635,911 | A | 6/1997 | Landers et al. |
| 5,649,687 | A | 7/1997 | Rosas et al. |
| 5,653,389 | A | 8/1997 | Henderson et al. |
| 5,703,554 | A | 12/1997 | Polgar et al. |
| 5,704,546 | A | 1/1998 | Henderson et al. |
| 5,772,114 | A | 6/1998 | Hunter |
| 5,785,246 | A | 7/1998 | King et al. |
| 5,801,948 | A | 9/1998 | Wood et al. |
| 5,864,781 | A | 1/1999 | White |
| 5,881,919 | A | 3/1999 | Womac et al. |
| 5,883,383 | A | 3/1999 | Dragne |
| 5,884,205 | A | 3/1999 | Elmore et al. |
| 5,884,224 | A | 3/1999 | McNabb et al. |
| 5,897,600 | A | 4/1999 | Elmore et al. |
| 5,911,362 | A | 6/1999 | Wood et al. |
| 5,913,915 | A | 6/1999 | McQuinn |
| 5,919,242 | A | 7/1999 | Greatline et al. |
| 5,924,371 | A | 7/1999 | Flamme et al. |
| 5,931,882 | A | 8/1999 | Fick et al. |
| 5,936,234 | A | 8/1999 | Thomas et al. |
| 5,938,071 | A | 8/1999 | Sauder |
| 5,941,303 | A | 8/1999 | Gowan et al. |
| 5,967,066 | A | 10/1999 | Giles et al. |
| 5,969,340 | A | 10/1999 | Dragne et al. |
| 5,971,294 | A | 10/1999 | Thompson et al. |
| 5,978,723 | A | 11/1999 | Hale et al. |
| 6,009,354 | A | 12/1999 | Flamme et al. |
| 6,012,996 | A | 1/2000 | Lo |
| 6,029,907 | A | 2/2000 | McKenzie |
| 6,070,538 | A | 6/2000 | Flamme et al. |
| 6,070,539 | A | 6/2000 | Flamme et al. |
| 6,079,340 | A | 6/2000 | Flamme et al. |
| 6,086,042 | A | 7/2000 | Scott et al. |
| 6,089,743 | A | 7/2000 | Mcquinn et al. |
| 6,093,926 | A | 7/2000 | Mertins et al. |
| 6,112,999 | A | 9/2000 | Fingleton et al. |
| 6,122,581 | A | 9/2000 | McQuinn |
| 6,138,922 | A | 10/2000 | Hartman et al. |
| 6,145,455 | A | 11/2000 | Gust et al. |
| 6,149,071 | A | 11/2000 | Maccallummhor et al. |
| 6,189,466 | B1 | 2/2001 | Sinclair et al. |
| 6,189,807 | B1 | 2/2001 | Miller et al. |
| 6,196,473 | B1 | 3/2001 | Beeren et al. |
| 6,199,000 | B1 | 3/2001 | Keller et al. |
| 6,209,563 | B1 | 4/2001 | Seid et al. |
| 6,216,614 | B1 | 4/2001 | Wollenhaupt |
| 6,230,091 | B1 | 5/2001 | McQuinn et al. |
| 6,236,924 | B1 | 5/2001 | Motz et al. |
| 6,240,861 | B1 | 6/2001 | Memory |
| 6,250,564 | B1 | 6/2001 | Chahley |
| 6,269,757 | B1 | 8/2001 | Kiest |
| 6,285,938 | B1 | 9/2001 | Lang et al. |
| 6,305,583 | B1 | 10/2001 | Ward et al. |
| 6,373,057 | B1 | 4/2002 | Penfold |
| 6,486,761 | B1 | 11/2002 | Czarnetzki et al. |
| 6,522,948 | B1 | 2/2003 | Benneweis |
| 6,533,334 | B1 | 3/2003 | Bonn |
| 6,584,920 | B1 | 7/2003 | Cresswell |
| 6,598,944 | B1 | 7/2003 | Wolff et al. |
| 6,606,542 | B2 | 8/2003 | Hauwiller et al. |
| 6,661,514 | B1 | 12/2003 | Tevs et al. |
| 6,666,384 | B2 | 12/2003 | Prandi |
| 6,678,580 | B2 | 1/2004 | Benneweis |
| 6,698,368 | B2 | 3/2004 | Cresswell |
| 6,708,080 | B2 | 3/2004 | Benneweis |
| 6,720,684 | B2 | 4/2004 | Czimmek |
| 6,755,390 | B2 | 6/2004 | Masuda et al. |
| 6,776,355 | B2 | 8/2004 | Ringer et al. |
| 6,851,377 | B2 | 2/2005 | Mayerle et al. |
| 6,853,276 | B2 | 2/2005 | Smith |
| 6,877,675 | B2 | 4/2005 | Benneweis |
| 6,877,717 | B2 | 4/2005 | Collins et al. |
| 6,959,907 | B2 | 11/2005 | Hironaka |
| 6,994,406 | B1 | 2/2006 | Krawczyk et al. |
| 7,124,964 | B2 | 10/2006 | Bui |
| 7,147,241 | B2 | 12/2006 | Beaujot et al. |
| 7,152,540 | B1 | 12/2006 | Sauder et al. |
| 7,156,322 | B1 | 1/2007 | Heitzman et al. |
| 7,162,961 | B2 | 1/2007 | Grimm |
| 7,195,027 | B2 | 3/2007 | Goossens et al. |
| 7,243,899 | B2 | 7/2007 | Acar et al. |
| 7,311,004 | B2 | 12/2007 | Giles |
| 7,347,221 | B2 | 3/2008 | Berger et al. |
| 7,395,769 | B2 | 7/2008 | Jensen |
| 7,441,746 | B2 | 10/2008 | Sugiyama |
| 7,472,660 | B2 | 1/2009 | Mariman et al. |
| 7,478,603 | B2 | 1/2009 | Riewerts et al. |
| 7,490,564 | B2 | 2/2009 | Allan et al. |
| 7,502,665 | B2 | 3/2009 | Giles et al. |
| 7,626,288 | B2 | 12/2009 | Protze |
| 7,654,473 | B2 | 2/2010 | Hibberd |
| 7,685,951 | B2 | 3/2010 | Beaujot et al. |
| 7,690,440 | B2 | 4/2010 | Dean et al. |
| 7,694,638 | B1 | 4/2010 | Riewerts et al. |
| 7,706,926 | B2 | 4/2010 | Peterson |
| 7,742,842 | B2 | 6/2010 | Giles et al. |
| 7,789,321 | B2 | 9/2010 | Hitt |
| 7,826,930 | B2 | 11/2010 | Giles et al. |
| 7,845,914 | B2 | 12/2010 | Engelbrecht et al. |
| 7,848,865 | B2 | 12/2010 | Di Federico et al. |
| 7,917,249 | B2 | 3/2011 | Jacobsen et al. |
| 7,954,731 | B2 | 6/2011 | Antonucci et al. |
| 8,078,367 | B2 | 12/2011 | Sauder et al. |
| 8,109,448 | B2 | 2/2012 | Giles |
| 8,141,504 | B2 | 3/2012 | Dean et al. |
| 8,170,825 | B2 | 5/2012 | Beaujot et al. |
| 8,186,288 | B2 | 5/2012 | Chinkiwsky |
| 8,191,795 | B2 | 6/2012 | Grimm et al. |
| 8,191,798 | B2 | 6/2012 | Hahn et al. |
| 8,196,534 | B2 | 6/2012 | Meyer et al. |
| 8,246,004 | B2 | 8/2012 | Kratzer |
| 8,401,704 | B2 | 3/2013 | Pollock et al. |
| 8,488,874 | B2 | 7/2013 | Zaman et al. |
| 8,523,085 | B2 | 9/2013 | Grimm et al. |
| 8,590,859 | B2 | 11/2013 | Kurz |

(56) References Cited

U.S. PATENT DOCUMENTS 8,634,993 B2 1/2014 McClure
8,635,963 B2 1/2014 Friggstad
8,701,707 B2 4/2014 Moosmann et al.
8,733,257 B2 5/2014 Beaujot et al.
8,733,259 B2 5/2014 Beaujot
8,739,830 B2 6/2014 Bradbury et al.
8,825,310 B2 9/2014 Kowalchuk
8,844,838 B2 9/2014 Funseth et al.
8,868,300 B2 10/2014 Kocer et al.
8,915,200 B2 12/2014 Barsi et al.
8,919,676 B2 12/2014 Funseth et al.
9,052,031 B2 6/2015 Leidig
9,061,296 B2 6/2015 Peterson
9,073,070 B2 7/2015 Funseth et al.
9,080,684 B2 7/2015 Stahr
9,113,591 B2 8/2015 Shivak
9,144,190 B2 9/2015 Henry et al.
9,266,124 B2 2/2016 Humpal
9,453,585 B2 9/2016 Sato et al.
9,470,332 B2 10/2016 Miura
9,504,212 B2 11/2016 Michael et al.
9,506,578 B2 11/2016 Lee
9,635,848 B2 5/2017 Needham et al.
9,702,475 B2 7/2017 Scheffel et al.
9,781,916 B2 10/2017 Preheim et al.
9,894,829 B2 2/2018 Shivak
10,058,879 B2 8/2018 Needham
10,173,236 B2 1/2019 Preheim et al.
10,189,031 B2 1/2019 Funseth et al.
10,368,538 B2 8/2019 Preheim et al.
10,518,284 B2 12/2019 Thurow et al.
10,568,257 B2 2/2020 Shivak
10,773,271 B2 9/2020 Funseth et al.
10,799,898 B2 10/2020 Posselius et al.
10,821,460 B2 11/2020 Batcheller et al.
11,051,505 B2 7/2021 Humpal et al.
11,071,247 B2 7/2021 Shivak et al.
11,130,573 B2 9/2021 Holly et al.
11,134,668 B2 10/2021 Preheim et al.
11,160,204 B2 11/2021 Michael
11,236,841 B2 2/2022 Krosschell et al.
11,612,160 B2 3/2023 Krosschell et al.
11,744,239 B2 9/2023 Kocer et al.
11,944,030 B2 4/2024 Shivak et al.
12,016,326 B2 6/2024 Kocer et al.
12,389,899 B2 8/2025 Kocer et al.
2002/0030119 A1 3/2002 Proharam
2002/0107609 A1 8/2002 Benneweis
2003/0028321 A1 2/2003 Upadhyaya et al.
2003/0070597 A1 4/2003 Cresswell
2003/0234301 A1 12/2003 Swan
2004/0036048 A1 2/2004 Petersen
2004/0104370 A1 6/2004 Suzuki
2004/0128045 A1 7/2004 Benneweis
2005/0000277 A1 1/2005 Giles
2005/0048196 A1 3/2005 Yanagita et al.
2005/0051749 A1 3/2005 Lee
2005/0076818 A1 4/2005 Grimm
2005/0092951 A1 5/2005 Groetzinger
2005/0125083 A1 6/2005 Kiko
2005/0173979 A1 8/2005 Voss
2006/0086295 A1 4/2006 Jensen
2006/0097210 A1 5/2006 Fong et al.
2006/0194699 A1* 8/2006 Moucharafieh ........ A01N 25/02
504/206
2006/0237562 A1 10/2006 Hedegard
2006/0265106 A1 11/2006 Giles et al.
2006/0273189 A1 12/2006 Grimm et al.
2007/0039880 A1 2/2007 Mayerle
2007/0128372 A1 6/2007 Wirth et al.
2008/0110476 A1 5/2008 Amestoy et al.
2008/0114497 A1 5/2008 Giles et al.
2008/0114498 A1 5/2008 Giles
2008/0147282 A1 6/2008 Kormann
2008/0163807 A1 7/2008 Dean et al.
2008/0230624 A1 9/2008 Giles et al.
2008/0283633 A1 11/2008 Nozaki et al.
2008/0296398 A1 12/2008 Hickman et al.
2009/0078178 A1 3/2009 Beaujot
2009/0101371 A1 4/2009 Melanson et al.
2009/0112372 A1 4/2009 Peterson
2009/0114210 A1 5/2009 Guice et al.
2009/0134237 A1 5/2009 Giles
2009/0184182 A1 7/2009 Beeren
2009/0271136 A1 10/2009 Beaujot et al.
2010/0032492 A1 2/2010 Grimm et al.
2010/0096476 A1 4/2010 Callies et al.
2010/0101469 A1 4/2010 Landphair et al.
2010/0132600 A1 6/2010 Dean et al.
2010/0163774 A1 7/2010 Rimboym et al.
2010/0269921 A1 10/2010 Pifer et al.
2011/0054743 A1 3/2011 Kocer et al.
2011/0160920 A1 6/2011 Orr et al.
2011/0179984 A1 7/2011 Beaujot et al.
2011/0204272 A1 8/2011 Kratzer
2011/0210186 A1 9/2011 Kugler et al.
2012/0045013 A1 2/2012 Chen et al.
2012/0080624 A1 4/2012 Stahr et al.
2012/0153051 A1 6/2012 Kah, Jr. et al.
2012/0168530 A1 7/2012 Ellingson et al.
2012/0169495 A1 7/2012 Kowalchuk
2012/0174843 A1 7/2012 Friggstad
2012/0195496 A1 8/2012 Zaman et al.
2012/0211508 A1 8/2012 Barsi et al.
2012/0216732 A1 8/2012 Ballard et al.
2012/0228395 A1 9/2012 Needham
2012/0241533 A1 9/2012 Moeller et al.
2012/0271467 A1 10/2012 Grimm et al.
2013/0032737 A1 2/2013 Neilson et al.
2013/0037633 A1 2/2013 Walter et al.
2013/0092746 A1 4/2013 Scott et al.
2013/0119154 A1 5/2013 Sawyer
2013/0192503 A1 8/2013 Henry et al.
2013/0269578 A1 10/2013 Grimm
2013/0292590 A1 11/2013 Stahr
2013/0306894 A1 11/2013 Weis et al.
2013/0320105 A1 12/2013 Schmidt
2013/0320106 A1 12/2013 Schmidt
2013/0333601 A1 12/2013 Shivak
2014/0014863 A1 1/2014 Najmolhoda et al.
2014/0026995 A1 1/2014 Mayr et al.
2014/0048002 A1 2/2014 Grimm et al.
2014/0084196 A1 3/2014 Heyer et al.
2014/0091243 A1 4/2014 Leidig
2014/0216315 A1 8/2014 Beaujot et al.
2014/0252111 A1 9/2014 Michael et al.
2014/0263705 A1 9/2014 Michael et al.
2014/0263708 A1 9/2014 Thompson et al.
2014/0263709 A1 9/2014 Kocer et al.
2014/0277780 A1 9/2014 Jensen et al.
2014/0299673 A1 10/2014 Grimm et al.
2014/0312141 A1 10/2014 Ravishankar
2014/0333398 A1 11/2014 Nila et al.
2014/0361094 A1 12/2014 Michael
2015/0115058 A1 4/2015 Wilger
2015/0257331 A1 9/2015 Shivak
2015/0336116 A1 11/2015 Gerdes
2015/0367352 A1 12/2015 Burchardt
2015/0367357 A1 12/2015 Humpal et al.
2015/0367358 A1 12/2015 Funseth et al.
2015/0375247 A1 12/2015 Funseth et al.
2016/0015020 A1 1/2016 Needham et al.
2016/0017792 A1 1/2016 Fletcher et al.
2016/0044862 A1 2/2016 Kocer et al.
2016/0084382 A1 3/2016 Pisasale
2016/0136671 A1 5/2016 Kocer
2016/0175869 A1 6/2016 Sullivan et al.
2016/0178422 A1 6/2016 Humpal et al.
2016/0227755 A1 8/2016 Preheim et al.
2016/0251008 A1 9/2016 Jeon et al.
2017/0018345 A1 1/2017 Raff et al.
2017/0050206 A1 2/2017 Bullock et al.
2017/0079200 A1 3/2017 Posselius et al.
2017/0095834 A1 4/2017 Kinard

(56) References Cited

U.S. PATENT DOCUMENTS

| | | | |
|---|---|---|---|
| 2017/0120263 | A1 | 5/2017 | Needham |
| 2017/0251656 | A1 | 9/2017 | Kolb et al. |
| 2017/0284285 | A1 | 10/2017 | Lenk et al. |
| 2017/0314580 | A1 | 11/2017 | Steensma et al. |
| 2017/0348718 | A1 | 12/2017 | Preheim et al. |
| 2018/0042214 | A1 | 2/2018 | Preheim et al. |
| 2018/0111148 | A1 | 4/2018 | Batcheller et al. |
| 2018/0126397 | A1 | 5/2018 | Le Cardinal et al. |
| 2018/0288934 | A1 | 10/2018 | Shivak |
| 2019/0029170 | A1 | 1/2019 | Wilger |
| 2019/0040972 | A1 | 2/2019 | Schrader |
| 2019/0047694 | A1 | 2/2019 | Zivan et al. |
| 2019/0321844 | A1 | 10/2019 | Schrader et al. |
| 2019/0350187 | A1 | 11/2019 | Kocer et al. |
| 2019/0373880 | A1 | 12/2019 | Kocer et al. |
| 2020/0037519 | A1 | 2/2020 | Wonderlich et al. |
| 2020/0101480 | A1 | 4/2020 | Schrader et al. |
| 2020/0107538 | A1 | 4/2020 | Preheim et al. |
| 2020/0113170 | A1 | 4/2020 | Davis et al. |
| 2020/0113171 | A1 | 4/2020 | Davis et al. |
| 2020/0214193 | A1 | 7/2020 | Shivak |
| 2020/0253111 | A1 | 8/2020 | Schlipf et al. |
| 2021/0016309 | A1 | 1/2021 | Bremer et al. |
| 2021/0076977 | A1 | 3/2021 | Abeyratne et al. |
| 2021/0102637 | A1 | 4/2021 | Krosschell et al. |
| 2021/0144906 | A1 | 5/2021 | Shivak et al. |
| 2021/0176977 | A1 | 6/2021 | Bremer et al. |
| 2021/0219538 | A1 | 7/2021 | Krosschell et al. |
| 2021/0282315 | A1 | 9/2021 | Charcosset |
| 2021/0289693 | A1 | 9/2021 | Harmon et al. |
| 2021/0400946 | A1 | 12/2021 | Burgers et al. |
| 2022/0062934 | A1 | 3/2022 | Ferren et al. |
| 2022/0079132 | A1 | 3/2022 | Preheim et al. |
| 2022/0088627 | A1 | 3/2022 | Chaim et al. |
| 2022/0099213 | A1 | 3/2022 | Krosschell et al. |
| 2022/0104427 | A1 | 4/2022 | Michael |
| 2022/0124962 | A1 | 4/2022 | Long et al. |
| 2023/0049963 | A1 | 2/2023 | Kocer et al. |
| 2023/0141050 | A1 | 5/2023 | Sibley et al. |
| 2023/0141867 | A1 | 5/2023 | Krosschell et al. |
| 2024/0130347 | A1 | 4/2024 | Kocer et al. |
| 2024/0307911 | A1 | 9/2024 | Kocer et al. |

FOREIGN PATENT DOCUMENTS

| | | | | | |
|---|---|---|---|---|---|
| AU | 2005247004 | | | 12/2006 | |
| AU | 2006202376 | B2 | | 12/2006 | |
| AU | 2009203181 | A1 | | 2/2010 | |
| AU | 2012201357 | A1 | | 9/2012 | |
| AU | 2013203361 | A1 | | 10/2013 | |
| AU | 2013204455 | A1 | | 3/2014 | |
| AU | 2013248190 | | | 5/2014 | |
| AU | 2013277513 | B2 | | 3/2017 | |
| AU | 2017285727 | B2 | | 7/2020 | |
| AU | 2020357581 | B2 | | 8/2023 | |
| AU | 2021209314 | B2 | | 8/2023 | |
| AU | 2023214344 | A1 | | 8/2023 | |
| AU | 2023258379 | | | 7/2025 | |
| BR | 112022026505 | A2 | | 5/2023 | |
| CA | 2229852 | A1 | | 8/1998 | |
| CA | 2517031 | A1 | | 9/2004 | |
| CA | 2528708 | A1 | | 11/2006 | |
| CA | 2549300 | A1 | | 12/2006 | |
| CA | 2674527 | A1 | | 2/2010 | |
| CA | 2770013 | A1 | | 9/2012 | |
| CA | 2811726 | A1 | | 10/2013 | |
| CA | 2813949 | A1 | | 2/2014 | |
| CA | 2830306 | | | 4/2014 | |
| CA | 2926448 | A1 | | 4/2015 | |
| CA | 2926448 | C | | 9/2020 | |
| CA | 3049421 | C | | 3/2023 | |
| CN | 102435019 | A | | 5/2012 | |
| CN | 202255911 | U | | 5/2012 | |
| CN | 102266829 | B | | 12/2012 | |
| CN | 203264929 | U | | 11/2013 | |
| DE | 102011053182 | | | 3/2013 | |
| DE | 112017003084 | T5 | | 6/2019 | |
| EP | 0086029 | | | 8/1983 | |
| EP | 0287552 | A2 | * | 10/1988 | ............ B05B 5/085 |
| EP | 0576121 | B1 | | 3/1996 | |
| EP | 969712 | | | 1/2000 | |
| EP | 0961659 | B1 | | 10/2002 | |
| EP | 0963255 | B1 | | 10/2002 | |
| EP | 0847307 | B2 | | 1/2003 | |
| EP | 0837735 | | | 2/2004 | |
| EP | 1426112 | B1 | | 6/2011 | |
| EP | 2249876 | | | 8/2012 | |
| EP | 3248463 | A1 | | 11/2017 | |
| EP | 3530115 | | | 8/2019 | |
| EP | 3565398 | B1 | | 6/2024 | |
| FR | 2964047 | A1 | | 3/2012 | |
| GB | 990346 | A | | 4/1965 | |
| GB | 2322573 | A | | 9/1998 | |
| JP | 2759711 | B2 | | 5/1998 | |
| JP | 2000139245 | A | | 5/2000 | |
| JP | 2005161221 | A | | 6/2005 | |
| JP | 2010127694 | A | | 6/2010 | |
| WO | WO-9712688 | A1 | | 4/1997 | |
| WO | WO-1997012688 | A1 | | 4/1997 | |
| WO | WO-98037751 | | | 9/1998 | |
| WO | WO-9842178 | A1 | | 10/1998 | |
| WO | WO-9916007 | A1 | | 4/1999 | |
| WO | WO-1999016007 | A1 | | 4/1999 | |
| WO | WO-2004023865 | | | 3/2004 | |
| WO | WO-2004081499 | | | 9/2004 | |
| WO | WO-2005048704 | A2 | | 6/2005 | |
| WO | WO-2008059984 | A1 | | 5/2008 | |
| WO | WO-2008112930 | A1 | | 9/2008 | |
| WO | WO-2010105221 | A1 | | 9/2010 | |
| WO | WO-2012022903 | A1 | | 2/2012 | |
| WO | WO-2013135430 | A1 | | 9/2013 | |
| WO | WO-2013191990 | A2 | | 12/2013 | |
| WO | WO-2013191990 | A3 | | 12/2013 | |
| WO | WO-2014201008 | A1 | | 12/2014 | |
| WO | WO-2014210043 | A1 | | 12/2014 | |
| WO | WO-2015058091 | A1 | | 4/2015 | |
| WO | WO-2016030368 | A1 | | 3/2016 | |
| WO | WO-2016145081 | A2 | | 9/2016 | |
| WO | WO-2017124175 | A1 | | 7/2017 | |
| WO | WO-2017192625 | A1 | | 11/2017 | |
| WO | WO-2017223252 | A1 | | 12/2017 | |
| WO | WO-2018129323 | A1 | | 7/2018 | |
| WO | WO-2018129376 | A2 | | 7/2018 | |
| WO | WO-2018129376 | A3 | | 7/2018 | |
| WO | WO-2020252239 | A1 | | 12/2020 | |
| WO | WO-2021066962 | A1 | | 4/2021 | |
| WO | WO-2021263024 | A1 | | 12/2021 | |
| WO | WO-2022094138 | A1 | | 5/2022 | |
| WO | WO-2022216285 | A1 | | 10/2022 | |
| WO | WO-2023278009 | A1 | | 1/2023 | |
| WO | WO-2023081371 | A1 | | 5/2023 | |
| WO | WO-2024192167 | A1 | | 9/2024 | |
| WO | 2024263873 | | | 12/2024 | |

OTHER PUBLICATIONS

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

(56) References Cited

OTHER PUBLICATIONS

"U.S. Appl. No. 13/832,678, Notice of Allowance mailed Jul. 20, 2016", 13 pgs.
"U.S. Appl. No. 13/832,678, Response filed May 12, 2016 to Final Office Action mailed Mar. 17, 2016", 10 pgs.
"U.S. Appl. No. 13/832,678, Response filed Jul. 27, 2015 to Restriction Requirement mailed Jun. 9, 2015", 7 pgs.
"U.S. Appl. No. 13/832,678, Response filed Dec. 31, 2015 to Non Final Office Action mailed Oct. 1, 2015", 10 pgs.
"U.S. Appl. No. 13/832,678, Restriction Requirement mailed Jun. 9, 2015", 7 pgs.
"U.S. Appl. No. 13/832,735, Final Office Action mailed Aug. 5, 2016", 29 pgs.
"U.S. Appl. No. 13/832,735, Non Final Office Action mailed Feb. 19, 2016", 26 pgs.
"U.S. Appl. No. 13/832,735, Non Final Office Action mailed Jul. 15, 2015", 22 pgs.
"U.S. Appl. No. 13/832,735, Response filed May 19, 2016 to Non Final Office Action mailed Feb. 19, 2016", 13 pgs.
"U.S. Appl. No. 13/832,735, Response filed Nov. 16, 2015 to Non-Final Office Action mailed Jul. 15, 2015", 16 pgs.
"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action mailed May 24, 2018", 16 pgs.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", 9 pgs.
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.
"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action mailed Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.
"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action mailed Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response filed Nov. 13, 2018 to Examiner's Reasons for Allowance mailed May 3, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.

(56) References Cited

OTHER PUBLICATIONS

"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Advisory Action mailed Nov. 3, 2023", 3 pgs.
"U.S. Appl. No. 16/476,016, Corrected Notice of Allowability mailed Feb. 22, 2024", 3 pgs.
"U.S. Appl. No. 16/476,016, Corrected Notice of Allowability mailed Mar. 13, 2024", 2 pgs.
"U.S. Appl. No. 16/476,016, Corrected Notice of Allowability mailed Apr. 16, 2024", 2 pgs.
"U.S. Appl. No. 16/476,016, Decision on Pre-Appeal Brief Request mailed Dec. 18, 2023", 2 pgs.
"U.S. Appl. No. 16/476,016, Examiner Interview Summary mailed Jan. 16, 2024", 2 pgs.
"U.S. Appl. No. 16/476,016, Examiner Interview Summary mailed Jan. 27, 2023", 2 pgs.
"U.S. Appl. No. 16/476,016, Examiner Interview Summary mailed Apr. 15, 2022", 2 pgs.
"U.S. Appl. No. 16/476,016, Examiner Interview Summary mailed Jun. 29, 2023", 2 pgs.
"U.S. Appl. No. 16/476,016, Examiner Interview Summary mailed Oct. 4, 2022", 2 pgs.
"U.S. Appl. No. 16/476,016, Final Office Action mailed Jan. 11, 2022", 15 pgs.
"U.S. Appl. No. 16/476,016, Final Office Action mailed Jul. 20, 2023", 21 pgs.
"U.S. Appl. No. 16/476,016, Final Office Action mailed Nov. 15, 2022", 20 pgs.
"U.S. Appl. No. 16/476,016, Non Final Office Action mailed Mar. 28, 2023", 22 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Notice of Allowability mailed May 21, 2024", 3 pgs.
"U.S. Appl. No. 16/476,016, Notice of Allowance mailed Feb. 14, 2024", 8 pgs.
"U.S. Appl. No. 16/476,016, Pre-Appeal Brief Request filed Nov. 20, 2023", 5 pgs.
"U.S. Appl. No. 16/476,016, Preliminary Amendment filed Jul. 3, 2019", 12 pgs.
"U.S. Appl. No. 16/476,016, Response filed Feb. 15, 2023 to Final Office Action mailed Nov. 15, 2022", 24 pgs.
"U.S. Appl. No. 16/476,016, Response filed Apr. 11, 2022 to Final Office Action mailed Jan. 11, 2022", 18 pgs.
"U.S. Appl. No. 16/476,016, Response filed Jun. 28, 2023 to Non Final Office Action mailed Mar. 28, 2023", 23 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Oct. 24, 2022 to Non Final Office Action mailed Jun. 24, 2022", 22 pgs.
"U.S. Appl. No. 16/476,016, Response filed Oct. 24, 2023 to Final Office Action mailed Jul. 20, 2023", 21 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/476,069, Corrected Notice of Allowability mailed Jan. 30, 2023", 2 pgs.
"U.S. Appl. No. 16/476,069, Examiner Interview Summary mailed Mar. 18, 2022", 2 pgs.
"U.S. Appl. No. 16/476,069, Examiner Interview Summary mailed U.S. Appl. No. 16/476,069, Examiner Interview Summary mailed Oct. 28, 2022", 2 pgs.
"U.S. Appl. No. 16/476,069, Final Office Action mailed Jul. 25, 2022", 13 pgs.
"U.S. Appl. No. 16/476,069, Non Final Office Action mailed Nov. 12, 2021", 13 pgs.
"U.S. Appl. No. 16/476,069, Notice of Allowance mailed Jan. 19, 2023", 8 pgs.
"U.S. Appl. No. 16/476,069, Notice of Allowance mailed Apr. 20, 2023", 8 pgs.
"U.S. Appl. No. 16/476,069, Preliminary Amendment filed Jul. 3, 2019", 13 pgs.
"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Response filed Oct. 25, 2022 to Final Office Action mailed Jul. 25, 2022", 13 pgs.
"U.S. Appl. No. 16/476,069, Restriction Requirement mailed May 3, 2021", 9 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance malled Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Corrected Notice of Allowability mailed Feb. 23, 2024", 3 pgs.
"U.S. Appl. No. 17/161,453, Corrected Notice of Allowability mailed Feb. 29, 2024", 2 pgs.
"U.S. Appl. No. 17/161,453, Final Office Action mailed Sep. 7, 2023", 7 pgs.
"U.S. Appl. No. 17/161,453, Non Final Office Action mailed Mar. 15, 2023", 17 pgs.
"U.S. Appl. No. 17/161,453, Notice of Allowance mailed Nov. 22, 2023", 5 pgs.
"U.S. Appl. No. 17/161,453, Preliminary Amendment filed Jan. 28, 2021", 8 pgs.
"U.S. Appl. No. 17/161,453, Response filed Jun. 15, 2023 to Non Final Office Action mailed Mar. 15, 2023", 15 pgs.
"U.S. Appl. No. 17/161,453, Response filed Nov. 7, 2023 to Final Office Action mailed Sep. 7, 2023", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.

(56) References Cited

OTHER PUBLICATIONS

"U.S. Appl. No. 17/410,852, Corrected Notice of Allowability mailed Mar. 6, 2024", 2 pgs.
"U.S. Appl. No. 17/410,852, Corrected Notice of Allowability mailed Mar. 13, 2024", 2 pgs.
"U.S. Appl. No. 17/410,852, Corrected Notice of Allowability mailed May 31, 2024", 2 pgs.
"U.S. Appl. No. 17/410,852, Final Office Action mailed Nov. 14, 2023", 8 pgs.
"U.S. Appl. No. 17/410,852, Non Final Office Action mailed Aug. 1, 2023", 9 pgs.
"U.S. Appl. No. 17/410,852, Notice of Allowance mailed Feb. 28, 2024", 5 pgs.
"U.S. Appl. No. 17/410,852, Preliminary Amendment filed Dec. 10, 2021", 8 pgs.
"U.S. Appl. No. 17/410,852, Response filed Feb. 14, 2024 to Final Office Action mailed Nov. 14, 2023", 10 pgs.
"U.S. Appl. No. 17/410,852, Response filed Nov. 1, 2023 to Non Final Office Action mailed Aug. 1, 2023", 15 pgs.
"U.S. Appl. No. 17/465,644, Notice of Allowance mailed Mar. 21, 2024", 12 pgs.
"U.S. Appl. No. 17/465,644, Preliminary Amendment filed Dec. 17, 2021", 11 pgs.
"U.S. Appl. No. 17/465,644, Response filed Dec. 13, 2023 to Restriction Requirement mailed Oct. 13, 2023", 11 pgs.
"U.S. Appl. No. 17/465,644, Restriction Requirement mailed Oct. 13, 2023", 6 pgs.
"U.S. Appl. No. 17/504,601, Preliminary Amendment filed Dec. 22, 2021", 7 pgs.
"U.S. Appl. No. 17/809,223, Advisory Action mailed Sep. 18, 2024", 3 pgs.
"U.S. Appl. No. 17/809,223, Examiner Interview Summary mailed Sep. 10, 2024", 3 pgs.
"U.S. Appl. No. 17/809,223, Final Office Action mailed Jun. 13, 2024", 19 pgs.
"U.S. Appl. No. 17/809,223, Final Office Action mailed Jul. 19, 2023", 17 pgs.
"U.S. Appl. No. 17/809,223, Non Final Office Action mailed Jan. 19, 2024", 17 pgs.
"U.S. Appl. No. 17/809,223, Non Final Office Action mailed Feb. 15, 2023", 15 pgs.
"U.S. Appl. No. 17/809,223, Preliminary Amendment filed Nov. 3, 2022", 7 pgs.
"U.S. Appl. No. 17/809,223, Response filed Apr. 19, 2024 to Non Final Office Action mailed Jan. 19, 2024", 19 pgs.
"U.S. Appl. No. 17/809,223, Response filed Jun. 14, 2023 to Non Final Office Action mailed Feb. 15, 2023", 17 pgs.
"U.S. Appl. No. 17/809,223, Response filed Sep. 13, 2024 to Final Office Action mailed Jun. 13, 2024", 18 pgs.
"U.S. Appl. No. 17/809,223, Response filed Dec. 19, 2023 to Final Office Action mailed Jul. 19, 2023", 14 pgs.
"U.S. Appl. No. 18/669,983, Preliminary Amendment filed Jun. 4, 2024", 7 pgs.
"U.S. Appl. No. 18/140,491, Preliminary Amendment Filed May 3, 2023", 15 pgs.
"U.S. Appl. No. 18/355,926, Preliminary Amendment", 6 pgs.
"U.S. Appl. No. 18/355,926, Preliminary Amendment filed Jan. 10, 2024", 6 pgs.
"U.S. Appl. No. 18/355,926, Restriction Requirement mailed Aug. 30, 2024", 10 pgs.
"U.S. Appl. No. 18/575,725, Supplemental Preliminary Amendment filed Jan. 16, 2024", 11 pgs.
"U.S. Appl. No. 18/669,983, Preliminary Amendment filed May 28, 2024", 3 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report malled May 21, 2019", 2 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023", 2 pgs.
"Australian Application Serial No. 2021209314, First Examination Report mailed Jan. 9, 2023", 5 pgs.
"Australian Application Serial No. 2021209314, Response filed Jul. 6, 2023 to First Examination Report mailed Jan. 9, 2023", 10 pgs.
"Australian Application Serial No. 2021297320, First Examination Report mailed Nov. 7, 2023", 2 pgs.
"Australian Application Serial No. 2021297320, Response filed Feb. 22, 2024 to First Examination Report mailed Nov. 7, 2023", 17 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Office Action mailed Dec. 4, 2023", w/ Machine English translation, 9 pgs.
"Brazilian Application Serial No. 1120160085175, Response filed Feb. 14, 2024 to Office Action mailed Dec. 4, 2023", w/ Machine English Translation, 10 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", W/ English Translation, 6 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Jul. 4, 2022 Opinion for non-patentability (RPI 7.1) mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Response filed Dec. 5, 2022 to Office Action mailed Sep. 6, 2022", w/ English Translation, 2 pgs.
"Brazilian Application Serial No. 1120180747017, Voluntary Amendment filed Jun. 22, 2020", (w/ English Translation), 44 pgs.
"Canadian Application Serial No. 2,877,195, Examiner's Rule 86(2) Report filed Nov. 21, 2022", 3 pgs.
"Canadian Application Serial No. 2,877,195, Office Action mailed Jun. 5, 2023", 3 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.

(56) References Cited

OTHER PUBLICATIONS

"Canadian Application Serial No. 2,877,195, Response filed Mar. 20, 2023 to Examiner's Rule 86(2) Report filed Nov. 21, 2022", 7 pgs.
"Canadian Application Serial No. 2,877,195, Response filed Apr. 8, 2021 to Office Action mailed Dec. 9, 2020", 16 pgs.
"Canadian Application Serial No. 2,877,195, Response filed Oct. 4, 2023 to Office Action mailed Jun. 5, 2023", 7 pgs.
"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Examiners Rule 86(2) Report mailed Jul. 6, 2023", 5 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Jan. 20, 2023 to Office Action mailed Sep. 26, 2022", 7 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3,049,391, Response filed Nov. 2, 2023 to Examiners Rule 86(2) Report mailed Jul. 6, 2023", 7 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"Canadian Application Serial No. 3,182,267, Examiners Rule 86(2) Report mailed Apr. 2, 2024", 7 pgs.
"Canadian Application Serial No. 3,185,961, Examiners Rule 86(2) Report mailed May 6, 2024", 3 pgs.
"Canadian Application Serial No. 3,185,961, Response filed Aug. 12, 2024 to Examiners Rule 86(2) Report mailed May 6, 2024", 8 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"Electrostatic Dispersal Solutions", https://web.archive.org/web/20170928035648/https://www.4rysprays.com/, (Captured on Sep. 28, 2017), 6 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Apr. 3, 2023", 4 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Sep. 12, 2023 to Communication Pursuant to Article 94(3) EPC mailed Apr. 3, 2023", 9 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"European Application Serial No. 18736496.3, Communication Pursuant to Article 94(3) EPC mailed Mar. 24, 2023", 10 pgs.
"European Application Serial No. 18736496.3, Communication Pursuant to Article 94(3) EPC mailed Dec. 12, 2023", 13 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response filed Jun. 10, 2024 to Communication Pursuant to Article 94(3) EPC mailed Dec. 12, 2023", 13 pgs.
"European Application Serial No. 18736496.3, Response filed Aug. 3, 2023 to Communication Pursuant to Article 94(3) EPC mailed Mar. 24, 2023", 10 pgs.
"European Application Serial No. 18736496.3, Response to Communication Pursuant to Rules 161(2) and 162 EPC filed Feb. 28, 2020", 14 pgs.
"European Application Serial No. 20872967.3, Extended European Search Report mailed Sep. 29, 2023", 9 pgs.
"European Application Serial No. 20872967.3, Response to Communication Pursuant to Rules 161 and 162 EPC filed Nov. 17, 2022", 9 pgs.
"European Application Serial No. 21827830.7, Voluntary Amendment filed Aug. 9, 2023", 6 pgs.
"European Application Serial No. 24174311.1, Extended European Search Report mailed Jul. 10, 2024", 5 pgs.
"German Application Serial No. 11 2017 003 084.6, Office Action mailed Feb. 5, 2019", (w/ English Translation), 5 pgs,.
"German Application Serial No. 11 2017 003 084.6, Response filed May 8, 2019 to Office Action mailed Feb. 5, 2019", (w/ Concise Statement of Relevance), 17 pgs.
"International Application Serial No. PCT/US2013/045445, International Preliminary Report on Patentability mailed Dec. 31, 2014", 7 pgs.

(56) References Cited

OTHER PUBLICATIONS

"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 15 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017". 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Preliminary Report on Patentability mailed Apr. 14, 2022", 6 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
"International Application Serial No. PCT/US2021/038955, International Preliminary Report on Patentability mailed Jan. 5, 2023", 7 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"International Application Serial No. PCT/US2022/027707, International Preliminary Report on Patentability mailed Jan. 11, 2024", 11 pgs.
"International Application Serial No. PCT/US2022/027707, International Search Report mailed Aug. 17, 2022", 5 pgs.
"International Application Serial No. PCT/US2022/027707, Written Opinion mailed Aug. 17, 2022", 9 pgs.
"International Application Serial No. PCT/US2022/048981, International Search Report mailed Apr. 13, 2023", 6 pgs.
"International Application Serial No. PCT/US2022/048981, Invitation to Pay Additional Fees mailed Jan. 19, 2023", 5 pgs.
"International Application Serial No. PCT/US2022/048981, Written Opinion mailed Apr. 13, 2023", 18 pgs.
"International Application Serial No. PCT/US2024/019793, International Search Report mailed Jun. 27, 2024", 5 pgs.
"International Application Serial No. PCT/US2024/019793, Written Opinion mailed Jun. 27, 2024", 10 pgs.
"Wilger 2019-20 Manufacturer's Suggested Retail Price List", (Revised Sep. 1, 2019), 20 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization a Nonpesticidal Method for Controlling Diseases, Nematodes, and Weeds", University of California Division of Agriculture and Natural Resources Publication 21377, (1997), 1-17.
Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.
"International Application Serial No. PCT US2024 034956, International Search Report mailed Oct. 8, 2024", 5 pgs.
"International Application Serial No. PCT US2024 034956, Written Opinion mailed Oct. 8, 2024", 8 pgs.
"U.S. Appl. No. 18/355,926, Examiner Interview Summary mailed Nov. 26, 2024", 2 pgs.
"U.S. Appl. No. 17/809,223, Non Final Office Action mailed Dec. 27, 2024", 7 pgs.
"Australian Application Serial No. 2023258379, First Examination Report mailed Jan. 16, 2025", 4 pgs.
"U.S. Appl. No. 18/355,926, Restriction Requirement mailed Dec. 3, 2024", 10 pgs.
"U.S. Appl. No. 18/355,926, Response filed Feb. 3, 2025 to Restriction Requirement mailed Dec. 3, 2024", 8 pgs.
"U.S. Appl. No. 18 355,926, Non Final Office Action mailed Feb. 12, 2025", 10 pgs.
"European Application Serial No. 24174311.1, Response filed Feb. 6, 2025 to Extended European Search Report mailed Jul. 10, 2024", 16 pgs.
"Australian Application Serial No. 2023258379, Response filed Mar. 13, 2025 to First Examination Report mailed Jan. 16, 2025", 3 pgs.

(56) References Cited

OTHER PUBLICATIONS

"U.S. Appl. No. 17/809,223, Response filed Mar. 27, 2025 to Non Final Office Action mailed Dec. 27, 2024", 11 pgs.
"U.S. Appl. No. 17/809,223, Notice of Allowance mailed Apr. 25, 2025", 5 pgs.
"U.S. Appl. No. 18/355,926, Response filed May 12, 2025 to Non Final Office Action mailed Feb. 12, 2025", 13 pgs.
"International Application Serial No. PCT US2024 019793, International Preliminary Report on Patentability mailed May 28, 2025", 13 pgs.
"U.S. Appl. No. 18/355,926, Final Office Action mailed Jul. 15, 2025", 11 pgs.
"European Application Serial No. 24174311.1, Communication Pursuant to Article 943 EPC mailed Oct. 9, 2025", 4 pgs.
"U.S. Appl. No. 18/604,330, Non Final Office Action mailed Nov. 4, 2025", 20 pgs.
"U.S. Appl. No. 19/279,385, Preliminary Amendment filed Nov. 24, 2025", 6 pgs.
Ei Operator, "Direct injection into the nozzle", [Online]. Retrieved from the Internet https www.eioperator.com direct-injection-into-the-nozzle , Accessed online Jul. 30, 2025, 7 pages.
"U.S. Appl. No. 18/355,926, Response filed Dec. 10, 2025 to Final Office Action mailed Jul. 15, 2025", 11 pgs.
"International Application Serial No. PCT US2024 034956, International Preliminary Report on Patentability mailed Jan. 2, 2026", 10 pgs.
"U.S. Appl. No. 18/355,926, Notice of Allowance mailed Jan. 30, 2026", 8 pgs.
"U.S. Appl. No. 18/604,330, Response filed Feb. 4, 2026 to Non Final Office Action mailed Nov. 4, 2025", 15 pgs.
"U.S. Appl. No. 18/355,926, Corrected Notice of Allowability mailed Feb. 12, 2026", 2 pgs.
"European Application Serial No. 24174311.1, Communication Pursuant to Article 943 EPC mailed Jun. 1, 2026", 5 pgs.
"Australian Application Serial No. 2024236520, Response filed Jun. 1, 2026 to First Examination Report mailed Apr. 24, 2026", 100 pgs.
"Australian Application Serial No. 2024236520, First Examination Report mailed Apr. 24, 2026", 3 pgs.
"U.S. Appl. No. 18/604,330, Notice of Allowance mailed Apr. 14, 2026", 9 pgs.
"U.S. Appl. No. 18/355,926, Corrected Notice of Allowability mailed May 4, 2026", 2 pgs.
"U.S. Appl. No. 18/604,330, Corrected Notice of Allowability mailed May 22, 2026", 2 pgs.

* cited by examiner

ELECTROSTATIC SPRAYING SYSTEM AND METHODS FOR SAME

CLAIM OF PRIORITY

This patent application claims the benefit of priority of Jared E. Kocer U.S. Provisional Patent Application Ser. No. 63/509,711, entitled "ELECTROSTATIC SPRAYING SYSTEM AND METHODS FOR SAME," filed on 22 Jun. 2023, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2024, Raven Industries, Inc. All Rights Reserved.

TECHNICAL FIELD

This document pertains generally, but not by way of limitation, to agricultural vehicles and associated implements for distributing or dispensing an agricultural product.

BACKGROUND

Agricultural vehicles conduct various operations in fields. In some examples vehicles conduct operations for treating targeted areas of a field. For example, agricultural sprayers distribute at least one agricultural product, such as fertilizers, pesticides, insecticides, herbicides and fungicides to targets including, but not limited to, crops or zones (areas) of a field. Agricultural fields are often irregular in shape, may include obstacles such as hills, valleys, waterways, ponds, vegetation, structures, or the like and targets may also vary regarding specified quantity of an agricultural fluid application.

Because agricultural sprayers may be expansive structures having multiple booms, the actual application of an agricultural product, such as an agricultural fluid, may vary substantially across booms as the sprayer moves through a field. The agricultural sprayer, for example, usually includes one or more distributions systems, such as a plurality of nozzles distributed along booms, to spray targets (e.g., crop rows) in a single pass. The booms in some examples are rigid and are actuated at one or more joints including a joint connected to the vehicle. Accordingly, as a boom is articulated (upward or downward) the associated nozzles move, and the nozzles ascend and descend differently. Variations in movement and position relative to targets further change with booms having articulating joints (e.g., at intermediate positions along the booms).

In some examples, a boom includes several plumbing lines that carry fluids dispensed from the nozzles. In one example, a first line transports a carrier fluid (e.g., water or a base agricultural product), and another (second) line transports an additive, such as fertilizer, insecticide, herbicide or fungicide. The agricultural product, for example, is retained in a source separate from the additive. The carrier fluid source is in communication, by way of a header tube or pipe, with multiple sections along one or more agricultural product booms (e.g., boom tubes). The carrier fluid is mixed with the additive in a specified amount. In one example, the additive and agricultural product fluid are separately transported from their respective sources to a nozzle assembly and mixed at the nozzle assembly.

In some examples, an inline mixer combines an additive with the carrier fluid upstream from or within a header. The header then delivers the agricultural product to the plumbing, and the agricultural product is distributed with each of the sections. The agricultural product of the carrier fluid and the additive is then sprayed from nozzles toward the targeted zones.

SUMMARY

The present inventors have recognized, among other things, that a problem to be solved can include providing a way to apply agricultural products, such as herbicides, fungicides, pesticides, insecticides, fertilizers or the like with enhanced accuracy, towards or to agricultural targets while doing so with decreased mixing of additives with carrier fluids. Agricultural targets, include, but are not limited to, weeds, fungi, pests, crops, soil, or the like. In some examples, an agricultural sprayer applies agricultural products to agricultural targets with an agricultural sprayer operating in a field. In another example, an unmanned aerial vehicle dispenses the product. In some examples, application of additives is conducted at one or more specified locations according to indexing of a field (e.g., with prescribed zones, areas or the like) maintained in a system associated with the sprayer, such as a field computer.

The sprayer is, in one example, a large agricultural implement or vehicle having plumbing to convey agricultural product to a plurality of nozzles disposed along a boom. In an example, the boom has one or more boom tubes, pipes or the like, extending along the boom. The sprayer includes at least one tank, container, or a similar source containing a fluid such as water or an agricultural product (e.g., a base agricultural product). In some examples, the sprayer supports one source located remotely relative to the nozzle assemblies (e.g., on the vehicle), or one source such as a cartridge or small container located proximate to the nozzle assembly (e.g., along the boom). In some examples the sprayer supports two sources (e.g., tanks, containers or the like), for instance a source for the carrier fluid such as water or a premixed base agricultural product and another one or more sources for one or more respective additives. In an example with two sources, the carrier fluid is transported through a first boom tube to the nozzles, and the additive is transported through a second boom tube to the nozzles. In an example, the agricultural product fluid and the additive are mixed proximate to the nozzle prior to application. In another example, the additive is mixed with the agricultural product fluid at a location upstream from the nozzle and transported after mixing to the nozzles. In another example, the additive is not mixed with the agricultural product before dispensing. For instance, for some nozzles is the additive is selectively mixed with agricultural products in while other nozzles do not receive the additive and only the agricultural product. For instance, the additive or agricultural product, or a mixture of the two, are controlled according to spray controller instructions that are different between two or more nozzles.

Application of the additive and agricultural product includes spraying the fluid in the form of droplets, for instance in a spray pattern or spray profile from nozzles. In an example, the spray includes droplets of mixed agricultural product and additive. The sprayed additive is broadly applied to a target zone, including targets therein, and is subject to wind drift caused by prevailing winds. For example, the spray of additive, in some examples, is broadly applied and deposited on targeted and non-targeted material, such as on crops when applying an herbicide. Accordingly, significant quantities of additive and agricultural product are mixed and applied to targets and non-targeted features in a field. In other examples, sprayed additive is subject to wind drift. For instance, a prevailing wind carries the sprayed additive droplets away from an intended target. In some examples, drifting droplets are errantly applied to a proscribed target (e.g., the wrong crop that will not benefit or poorly benefits from the agricultural product in an adjacent zone or field).

In an example, the present subject matter provides a solution to these problems, by providing electrostatic spraying in one or more formats that facilitates accurate targeting with an agricultural product while minimizing overall application and consumption of corresponding quantities of agricultural product and additives. Electrostatic spraying facilitates the minimization of plumbing on a sprayer while at the same time permitting rapid and accurate application of sprayed additives in targeted as well as broad applications. Various examples of electrostatic nozzle assemblies are provided herein. The electrostatic nozzle assemblies spray electrostatically charged agricultural product, in one example, without mixing additives with an agricultural product, such as water, in the plumbing of the agricultural sprayer.

In an example, the droplets of one or more of an agricultural product or additives are dispensed through one or more associated orifice plates, modulating nozzles or similar mechanisms, that are configured to transition a fluid (e.g., agricultural product or additive) to droplets. In an example, the fluid is transitioned into droplets of a specified size before contacting an electrostatic charging element.

The electrostatically charged additive droplets are attracted to the agricultural product droplets (having a relatively neutral charge) and attach to the agricultural product droplets. The agricultural product droplets and attached electrostatically charged additive droplets form composite droplets. For instance, the additive droplets 'piggy-back' or 'hitch a ride' on the agricultural product droplets. The electrostatically charged additive is carried by the agricultural product in contrast to mixing with the agricultural product in the sprayer plumbing, tanks of the like. In an example, the additive adheres to the agricultural product and forms a composite droplet (one or more agricultural fluid droplets attached to an agricultural product droplet) after dispensing from each respective nozzle. The electrostatically charged additive attached to the agricultural product has a relatively negative charge and is attracted to surfaces of the agricultural target (such as leaves, including downward facing leaf surfaces) and adheres to the surfaces. In some examples, the additive and agricultural product are attracted to and engage along downward facing surfaces of the target, such as the downward facing leaf surfaces, leaf undersides or the like.

In an example, electrostatic charging of the agricultural fluid is conducted with one or more electrostatic charging elements. For instance, an electrostatic charging field is generated with one or more charging elements proximate to one or more associated spray nozzles. The sprayed fluid (e.g., one or more of the agricultural products or the additive) is charged by the one or more charging elements.

In an example, the spray includes droplets of at least one of agricultural fluid or droplets of agricultural product. In one example, at least one orifice plate within the nozzle assembly converts a stream of agricultural fluid or agricultural product to droplets at the nozzle orifice (e.g., opening toward the environment). The orifice plate is optionally located proximate to an orifice (e.g., at the nozzle orifice, 1 inch or less, 2 inches or less or the like) of the nozzle.

In another example, one nozzle assembly forms droplets of additive and a second, different, nozzle assembly forms separate droplets of agricultural product. In an example, the sprayer has one nozzle assembly that sprays at least one additive. In another example, there are one or more nozzle assemblies having associated orifice plates, and each nozzle assembly sprays one of the additive or the agricultural product. Accordingly, each of the nozzle assemblies generates sprays of the respective additive or agricultural product (e.g., water, a base agricultural product or the like).

The electrostatically charged agricultural fluid, in some examples, attaches to the agricultural product droplets sprayed from the agricultural product nozzles. For instance, the electrostatic nozzle sprays charged additive droplets toward an agricultural target proximate to an agricultural product spray of droplets, such as water. The charged additive droplets attach to the agricultural product droplets. In another example, the electrostatic nozzle assembly sprays the charged additives without an associated agricultural product. In this example, the additive is its own agricultural product and the charged spray attached to targets, for instance by way of the electrostatic charge.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
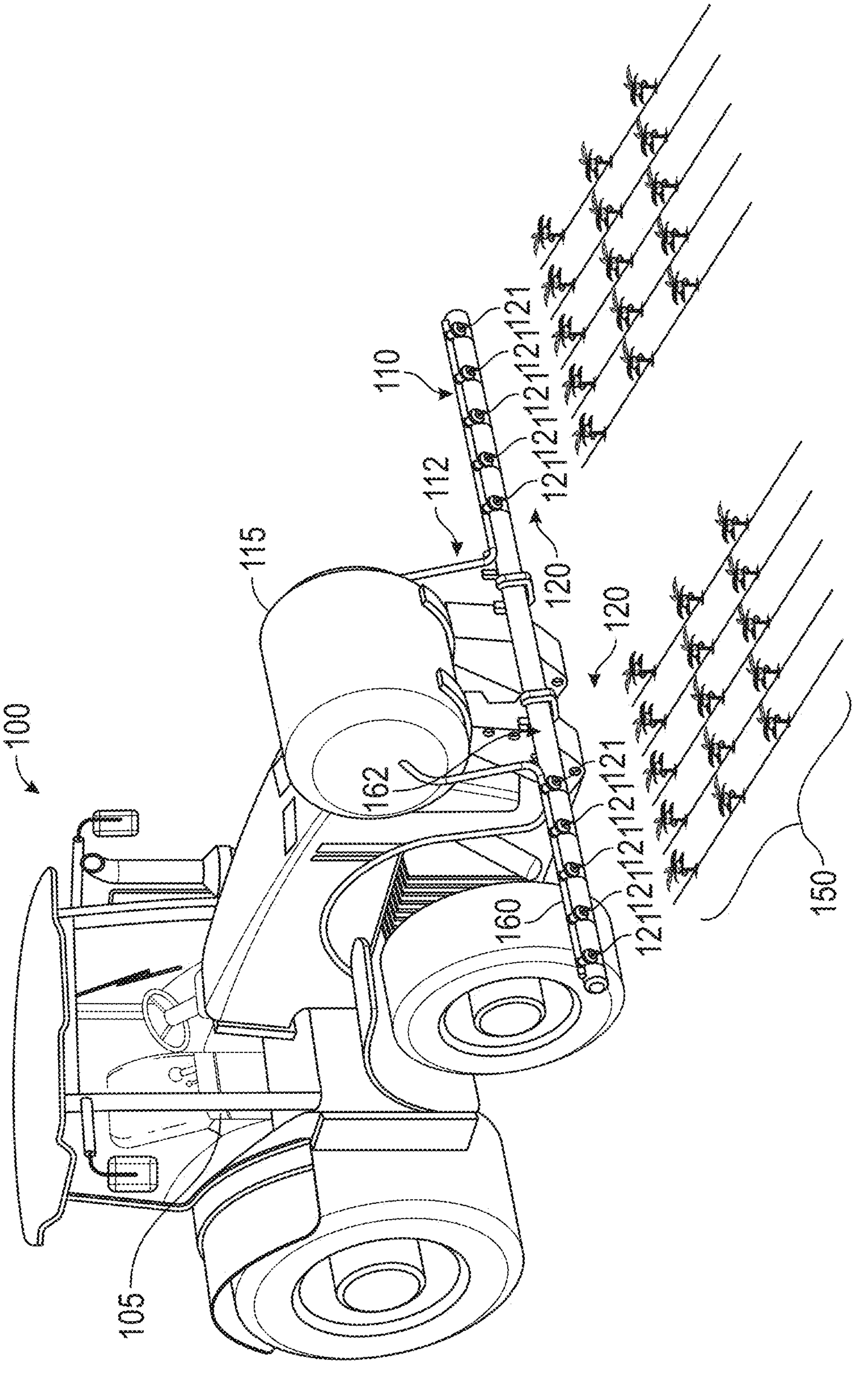
FIG. 1 is a perspective view of an example agricultural vehicle with a sprayer according to at least one embodiment of the present application.

An agricultural vehicle such as a sprayer operates in a field before planting, after planting or while crops are growing. For example, the sprayer progresses through the field and dispenses, sprays or the like, fluid at specified locations according to indexed locations (zones, areas or the like) received or stored by a nozzle assembly controller associated with the sprayer, such as a field computer. The sprayer then applies an agricultural product (such as a pesticide, herbicide, water, a mixture of fluids or the like) to agricultural targets.

In examples, the sprayer includes a boom tube or sprayer boom including a plurality of nozzle assemblies. For example, at least one of the nozzle assemblies dispenses fluid (e.g., liquid or particles that have been aerated and fluidized) from a fluid source on with the agricultural vehicle towards specified agricultural targets. In some instances, the nozzle assemblies are individually or jointly coupled to a separate agricultural fluid (e.g., agricultural product as a liquid or particles that have been aerated or fluidized) source and agricultural product (water, mixture of fluids or the like) source. In an example, the agricultural fluid source is coupled with a single nozzle assembly or a plurality of nozzle assemblies. In one example, the agricultural fluid (e.g., agricultural product as a liquid or particles that have been aerated or fluidized) source includes more than one type of agricultural fluid such as a mixture of an agricultural product and an agricultural fluid such as a pesticide, herbicide, or the like. In another example, each nozzle assembly is coupled with associated plumbing that in turn is coupled to a fluid tank (a container, drum, cartridge or the like containing water, agricultural fluid, or the like).

As the agricultural vehicle progresses through a field distributing, dispensing, applying, or the like, a specified fluid (e.g., agricultural fluid or agricultural product), the agricultural fluid, in some circumstances, is not fully or sufficiently applied to the agricultural target. In some situations, it is difficult for agricultural fluids to reach the underside of some agricultural products. Electrostatically charged additives (bound or not to an agricultural product droplet), in some examples, are sized and sprayed to facilitate being deposited on any side, such as the underside, of the targeted agricultural product (e.g., downward facing leaves).

In an example, the additive (e.g., fertilizer, herbicide, pesticide, fungicide or the like as a liquid or particles that have been aerated or fluidized) dispensed from the nozzle assembly is electrostatically charged (e.g., positively or negatively). The electrostatically charged agricultural fluid is, for example, dispensed in the form of a droplet, a stream, a mist or any combination thereof. In an example, one or more electrostatically charged agricultural fluid droplet adheres to at least one droplet of agricultural product and is dispensed to reach the underside of leaves, vegetation or pests. For example, the droplets of electrostatically charged agricultural fluid adhere (e.g., bond, join, fasten, couple) to the surface, or close to the surface, of droplets of the agricultural product. In some situations, several droplets of electrostatically charged agricultural fluid adheres to one droplet of agricultural product. Hereinafter, the agricultural fluid that, for example, will be subjected to an electrostatic charge. In an example, of the present application is an "additive fluid" or an "additive droplet". An additive fluid or an additive droplet is, for example, an agricultural product supplied to adhere with an agricultural product. The additive fluid, for example, is dispensed as a liquid droplet or an aerated or fluidized particle.

Illustrated in FIG. 1 is an agricultural vehicle 100 such as a tractor, all-terrain vehicle, truck or the like. In an example, a sprayer 110 is coupled with the agricultural vehicle 100. The sprayer 110 is optionally coupled with a front portion of the agricultural vehicle 100 or a rear portion of the agricultural vehicle 100, relative to the direction of travel of the agricultural vehicle 100. For example, the sprayer 110 coupled to the agricultural vehicle 100 effects dispensing, distribution, application or the like of a specified fluid to the agricultural target 150. In examples, the agricultural vehicle includes a nozzle assembly controller 105 that controls the electrostatic nozzle system. The agricultural target 150 is, for example, crops, weeds, pests or soil, according to the specified purpose.

The sprayer 110 coupled, for example, to a fluid source 115 retains one or more of an additive such as a pesticide, herbicide or the like, or an agricultural product (e.g., agricultural product fluid, water or a mixture of fluids). Plumbing 112 couples the fluid source 115 with the sprayer 110. In an example, the plumbing 112 is coupled with a sprayer boom 160. The sprayer boom 160 includes, for example, one or more boom tubes 162 extending along the sprayer boom 160. In another example, the one or more boom tubes 162 includes an arrangement of nozzles 121 along the sprayer boom 160.

In some examples, the arrangement of nozzles 121 includes one or more nozzle assemblies 120. For instance, there are one or more nozzle assemblies 120 arranged along the one or more boom tubes 162 are regularly spaced along the one or more boom tubes 162. In other examples the one or more nozzle assemblies 120 are irregularly spaced along the one or more boom tubes 162. For example, each individual nozzle assembly 121 of the one or more nozzle assemblies 120 are placed on the one or more boom tubes 162 according to the spacing of the agricultural target 150 in a field.

Optionally, the one or more nozzle assemblies 120 are coupled with one or more proximate components of the implement (e.g., sprayer), such as portions of the one or more boom tube 162 adjacent to the individual nozzle assembly 121, plumbing components (e.g., valves or the like), or instruments (pressure transducers, flow meters, camera to view the spray pattern). In an example, the one or more nozzle assemblies 120 dispenses an additive in a spray pattern. The spray pattern, for example, dispenses an additive toward agricultural products according to type of agricultural product or accounting for environmental conditions (e.g., wind, temperature, field profile, or the like).

Figure 2:
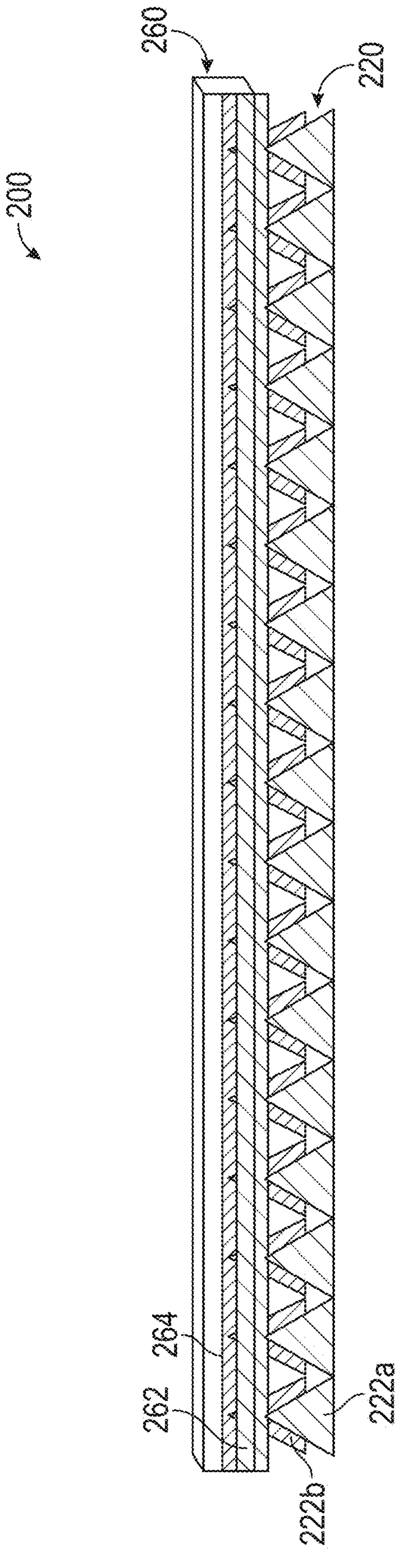
FIG. 2 is a schematic front view of an example sprayer system according to at least one embodiment of the present application.

As illustrated in FIG. 2, in some examples, the specified spray pattern or application of additive is accomplished with one or more nozzles 220, such as a first nozzle 222*a* and a second nozzle 222*b*. For example, a composite nozzle system 200 includes a sprayer boom 260 having a first boom tube 262 and a second boom tube 264. In an example, with a first boom tube 262 and a second boom tube 264, each boom tube is coupled with a fluid source. For example, the first boom tube 262 is coupled with an agricultural product source (herein after agricultural product refers to one or more of an additive, either liquid or fluidized, such as a pesticide, herbicide, fertilizer; agricultural product; or base agricultural product of a agricultural product and additive or the like) and the second boom tube 264 is coupled with another agricultural product source, for instance a different or same additive, agricultural product or base agricultural product. While two boom tubes are discussed, optionally, more than two boom tubes are included to carry specified fluids according to the configuration of the system.

Optionally, more than one additive is specified (such as two additives) in addition to an agricultural product. In such an example, a third boom tube is included to isolate different agricultural products from mixing together with each other and the agricultural product until specified. In another example, more than two boom tubes are included and carry a first agricultural product (e.g., additive, mixture of additives, agricultural product and one or more additives or the like) in a first boom tube, a second agricultural product in a second boom tube, and a third boom tube having a third agricultural product, such as an agricultural product or another base agricultural product.

As illustrated in FIG. 2, the first boom tube 262 is positioned in front of the second boom tube 264, relative to a direction of travel out of the page. In an example, the position of the first boom tube 262 relative to the second boom tube 264 also positions a first nozzle 222*a* coupled with the first boom tube 262 proximate relatively to a second nozzle 222*b* coupled with the second boom tube 264. In some examples, the first nozzle 222*a* is positioned directly in front of the second nozzle 222*b*. In other examples the first nozzle 222*a* is offset relative to the second nozzle 222*b* (e.g., by one inch or less, 3 inches or less or the like). The placement of the first nozzle 222*a* with respect to the second nozzle 222*b* is, in one example, specified by the profiles of the sprays from the respective nozzles, for instance to facilitate attachment of the first and second droplets.

Figure 3:
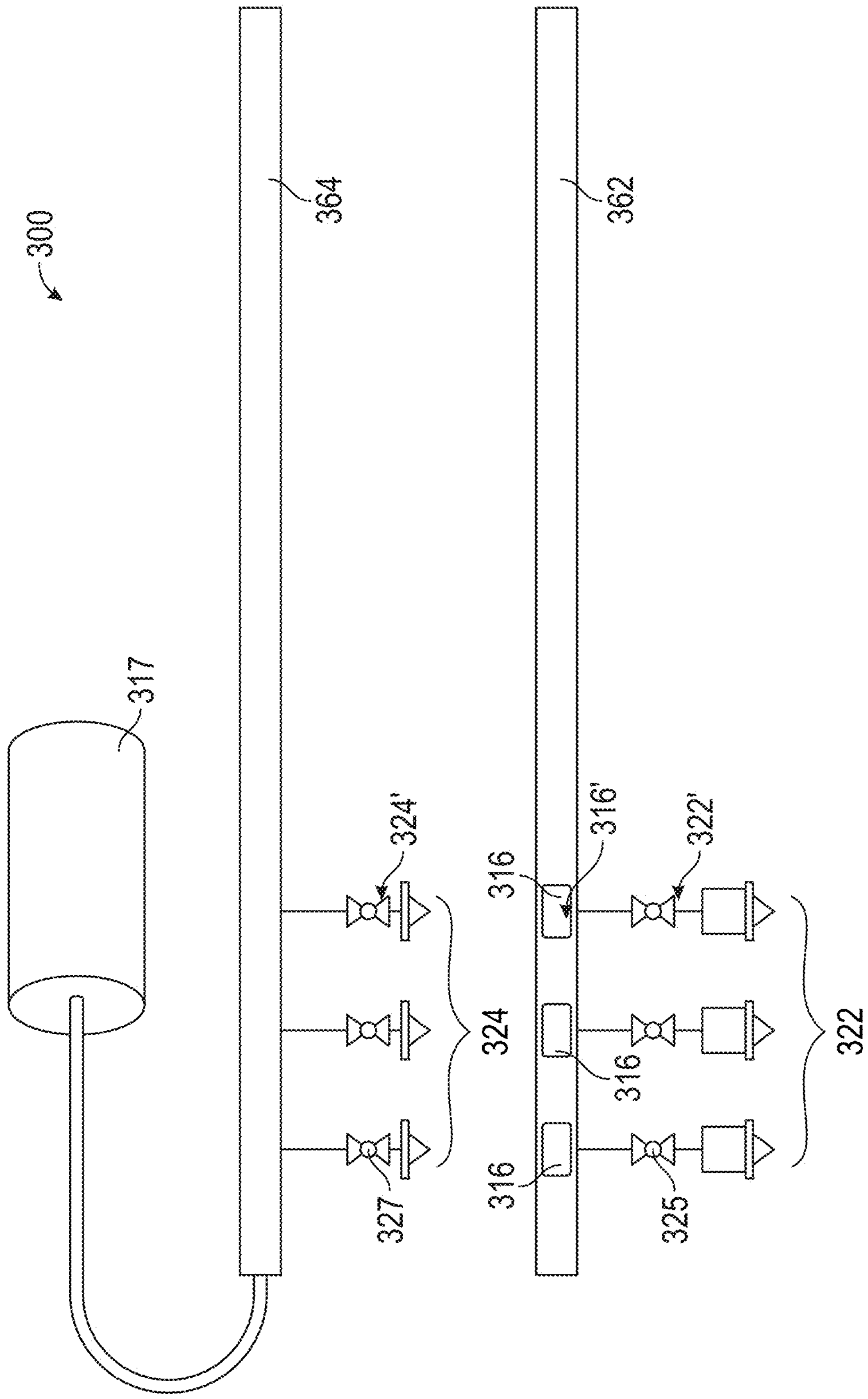
FIG. 3 is a schematic view of an example sprayer system according to at least one embodiment of the present application.

FIG. 3 illustrates a schematic view of a composite nozzle system 300 including a first boom tube 362 and a second boom tube 364. In an example, the first boom tube 362 is positioned in front of the second boom tube 364 relative to a direction of travel of an agricultural vehicle (e.g., downward along the page). However, in other examples, the first boom tube 362 is positioned behind the second boom tube 364. The orientation of the first boom tube 362 relative to the second boom tube 364 is specified, for example, by the fluids dispensed from the nozzles of each of the first boom tube 362 and the second boom tube 364. In an example, the first boom tube 362 includes one or more first agricultural product (e.g., one or more additives such as fertilizers, pesticides, insecticides, herbicides or fungicides; base agricultural product or agricultural product) nozzle assemblies 322 and the second boom tube 364 includes one or more second agricultural product nozzle assemblies 324. In one example, the second agricultural product includes an agricultural product, and the first agricultural product includes one or more additives. The one or more first agricultural product nozzle assemblies 322 and one or more second agricultural product nozzle assemblies 324 include, for example, one or more of associated fluid sources (e.g., additive cartridges or chambers), modulating elements and nozzles as described herein.

In examples, the first boom tube 362 is in communication with one or more first fluid sources 316. For example, the one or more first fluid sources 316 are attached to the first boom tube 362 (including the boom tube itself, the associated nozzles or the like). In another example, the one or more first fluid sources 316 are remote from the first boom tube 362 and are in fluid communication with the first boom tube 362 by way of plumbing. In some examples, each of the one or more first fluid sources 316 are directly coupled with one or more additive nozzle assemblies 322. For example, each of the one or more first fluid sources 316 includes a cartridge, container, vessel or the like having an agricultural product, such as an additive, positioned proximate to each of the one or more additive nozzle assemblies 322. For example, plumbing to deliver the additive from the one or more first fluid sources 316 is localized to an associated one or more additive nozzle assemblies 322. In examples, nozzle assemblies with localized one or more first fluid sources 316 facilitate a reduction (e.g., minimization, decrease or elimination) of sprayer plumbing.

In another example, a single fluid source 316' (e.g., an additive cartridge including a concentrate of an additive, agricultural product or the like) of the one or more first fluid sources 316 is coupled with a single nozzle assembly 322'. For instance, the single fluid source 316' is fluidly coupled with several associated nozzle assemblies 322 along the first boom tube 362 and, optionally, a single fluid source 316' is fluidly coupled with a different set of associated nozzle assemblies 322. In such an example, each of the one or more fluid sources 316 contains a different agricultural product (e.g., additives or the like). In another example, each of the one or more fluid sources 316 contains the same agricultural product.

Optionally, the agricultural product contained in the one or more first fluid sources 316 is an additive. For example, the one or more first fluid sources 316 contain one or more of a pesticide, herbicide, fertilizer or the like as a concentrate, premixed agricultural product in a liquid or fluidized particulate form. Optionally, the one or more first fluid sources 316 contain a mixture of two or more agricultural products. While one or more first fluid sources 316 is discussed herein as containing an agricultural product, it is contemplated for the one or more fluid sources 316 to contain an agricultural product, a combination of agricultural product and additive instead of just an additive.

Sprayer plumbing is also reduced in examples with agricultural product, an agricultural product source 317 (e.g., an agricultural product reservoir) coupled with the second boom tube 364 separated from the agricultural product of the first fluid sources 316. For example, the agricultural product source 317 distributes agricultural product directly to one or more agricultural product nozzle assemblies 324 without intermediate plumbing for mixing. For example, the agricultural product contained in the agricultural product source 317 is distributed directly to the one or more agricultural product nozzle assemblies 324 with plumbing interconnecting the agricultural product source 317 and the one or more agricultural product nozzle assemblies 324. Optionally, there is more than one agricultural product source 317 coupled with the second boom tube 364. Each agricultural product source 317, for example, contains a different agricultural product. For example, a first agricultural product source 317 supplies water as an agricultural product fluid and a second agricultural product source 317 supplies a pre-mixed agricultural product of water and at least one additive. For example, a second agricultural product source is positioned relative to the second boom tube and supplies the pre-mixed agricultural product to one or more of the agricultural product (e.g., water, base agricultural product, or the like) nozzle assemblies 324. In some instances, the second agricultural product source 317 is interconnected with the second boom tube with plumbing that avoids intermixing of the first agricultural product from the second agricultural product.

The agricultural product source 317, as stated previously, is coupled with the second boom tube 364 with plumbing. One or more agricultural product nozzle assemblies 324 are coupled with the second boom tube 364 to receive the agricultural product, such as a carrier fluid, distributed from the agricultural product source 317.

In examples, the quantity of agricultural products, such as agricultural product, additives, premixed agricultural products or the like, respectively sprayed through each of the single additive nozzle assembly 322' and the single agricultural product nozzle assembly **324*a* is controlled at the associated nozzle assemblies. For example, each of the single additive nozzle assembly 322' and the single carrier nozzle assembly 324' has an associated modulating element (e.g., valve, orifice plate, fitting or the like). The single additive nozzle assembly 322*a* optionally includes an additive modulating element 325, for instance a valve. And the single agricultural product nozzle assembly 324*a* optionally includes an agricultural product modulating element 327. Each of the additive modulating element 325 and the agricultural product modulating element 327** regulates (e.g., controls, manages, maintains or changes) the quantity (flow rate, dispense pressure) of the respective fluid distributed through the associated nozzle assembly.

Figure 4:
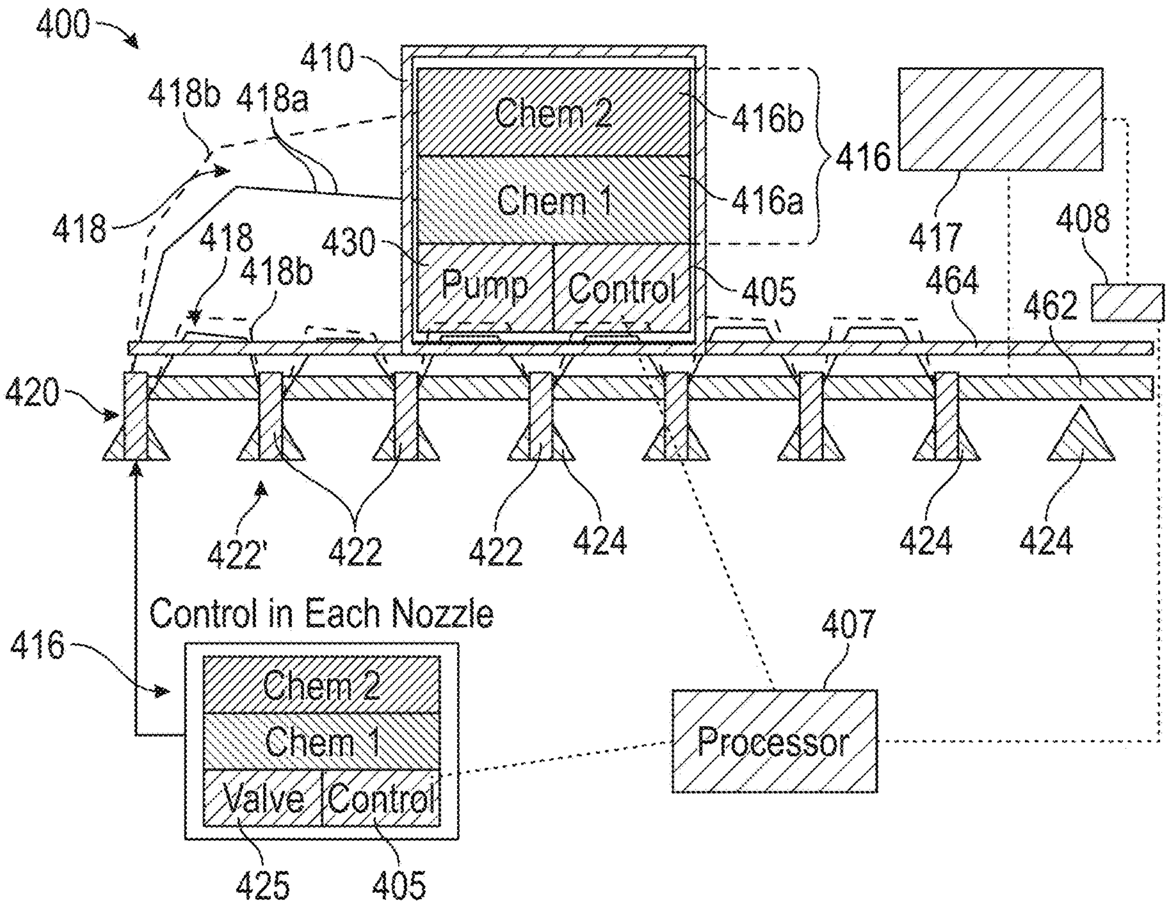
FIG. 4 is one example of a composite nozzle system according to at least one embodiment of the present application.

FIG. 4 illustrates an example of a composite nozzle system 400. The composite nozzle system 400 includes a boom tube 462 with one or more nozzle assemblies 420. The one or more nozzle assemblies 420 includes one or more electrostatic nozzle assemblies 422 and one or more agricultural product nozzle assemblies 424. The one or more electrostatic nozzle assemblies 422 provides, for example, a controlled spray of charged additive droplets to a supply of sprayed carrier droplets (agricultural product droplets). The charged additive droplets are, for example, droplets of an agricultural product such as fertilizers, pesticides, insecticides, herbicides and fungicides. Hereinafter, additive whether as a fluid, liquid, particulate or droplet, also includes agricultural products as previously described. The charged additive droplets adhere (e.g., bond, join, fasten, couple) to the agricultural product droplet (having a neutral or lesser charge) and are readily transported toward a target in the manner of additive droplets 'piggybacked' to the agricultural product droplets. For example, the agricultural product droplets and the adhere (e.g., bond, join, fasten, couple) additive droplets form composite droplets (see FIGS. 8A, B). The agricultural product nozzle assembly 424 provides a base spray of the agricultural product (e.g., water or a base additive), and the one or more additive fluid nozzle assemblies 422 sprays a proximate spray pattern of electrostatically charged additive droplets that attach to the agricultural product droplets.

In examples, the charged additive droplets and agricultural product droplets are sprayed from respective one or more additive fluid nozzle assemblies 422 and the agricultural product nozzle assemblies 424. For example, one or more additive fluid sources 416 and one or more agricultural product sources 417 deliver the respective fluids to the respective nozzles. In an example, there are multiple additive sources (e.g., one, two, three, four, five agricultural fluids) spaced along a second boom tube 464. Optionally, each of the additives are dispensed individually to the associated one or more additive fluid nozzle assemblies 422 as a mixture. In an example, the additives are mixed proximate to the nozzle assembly 422 or within the nozzle assembly 422.

As illustrated, the one or more additive fluid nozzle assemblies 422 is fluidly coupled with one or more additive fluid sources 416 (416*a, b*) either directly or remotely. Plumbing 418 such as tubes, manifolds, control valves, pumps, flow meters or the like fluidly couples the one or more additive fluid sources 416 with the one or more additive fluid nozzle assemblies 422. The plumbing 418 is, in one example, directly connected with a single additive nozzle assembly 422'. With the direct connection the distance the additive fluid of the additive fluid sources 416 travels to the single additive nozzle assembly 422' is reduced. In another example, the each of the one or more additive fluid sources 416 is positioned proximate to one or more additive fluid nozzle assemblies 422, respectively. In some instances, an individual one or more additive fluid sources 416 is fluidly coupled with a single additive fluid nozzle assembly 422'. In another example, the single additive fluid source is fluidly coupled with several of the one or more additive fluid nozzle assemblies 422. In yet another example, the single additive fluid source 416 (e.g., a cartridge of an additive, reservoir or the like) is coupled with the first boom tube 462 and distributes additive fluid through the first boom tube 462 to each of the one or more additive fluid nozzle assemblies 422.

In an example, the one or more additive fluid source 416 includes a first supply **416*a* of a first additive fluid (e.g., first additive) and a second supply 416*b* of a second additive fluid (e.g., second additive). In examples, the first supply 416*a* includes a first passage 418*a* for delivery of the additive to the first boom tube 462, and from the first boom tube 462 to the one or more additive fluid nozzle assemblies 422. The second supply 416*b* of a second additive fluid includes a second additive passage 418*b* connected with the first boom tube 462. The second additive passage 418*b* supplies an optional second additive fluid for spraying from the one or more additive fluid nozzle assemblies 422. In an example, the second additive fluid is dispensed separately (e.g., from its own additive nozzle assembly) and is delivered in a different boom tube than a first additive fluid. In another example, the second additive fluid and the first additive fluid are mixed and supplied as a mixture (e.g., from the first boom tube 462) to the one or more additive fluid nozzle assemblies 422**.

As described above, the first passage **418*a* and the second passage 418*b*, in one example, extend through the first boom tube 462. For example, the first passage 418*a* and the second passage 418*b* are separated from each other with a partition extending within the first boom tube 462. In another example, the first passage 418*a* and the second passage 418*b* are separate tubes extending through the first boom tube 462**.

In some examples, the one or more additive fluid sources 416 are contained within an additive fluid distributor 410. The additive fluid distributor 410 includes, for example, one or more cartridges, containers, cassettes or the like positioned proximate to each of the one or more additive fluid nozzle assemblies 422. For example, the additive fluid distributor 410, including a cartridge, is installed to the associated additive fluid nozzle assembly 422. In examples, one or more additive fluid distributors 410 are positioned proximate to each of the one or more additive fluid nozzle assemblies 422, respectively. In other examples, a single additive fluid distributor 410 is proximate to several of the one or more additive fluid nozzle assemblies 422 to supply the same additive (or multiple additives) to the associated additive fluid nozzle assemblies 422.

In addition to the one or more additive fluid sources 416, the additive fluid distributor 410 optionally includes one or more of a controller 405, plumbing or modulating element 430. In an example, the controller 405 is in communication with a processor 407 (or optionally includes its own processor; electronic control unit, ECU; or the like). The processor 407 optionally is a component of the agricultural vehicle, such as the field computer, dedicated sprayer controller or the like. In another example the processor 407 is a cloud-based system, computer system, or the like. In examples, the processor 407 reciprocally communicates with the controller 405 to control (e.g., regulate, modulate, maintained, direct, monitor or the like) for example, a modulating element 430, such as a pump, valve or the like. The modulating element 430, for example, controls the flow rate of the additive fluid to the associated boom tube 462, additive fluid nozzle assemblies 422 or the like.

Figure 5:
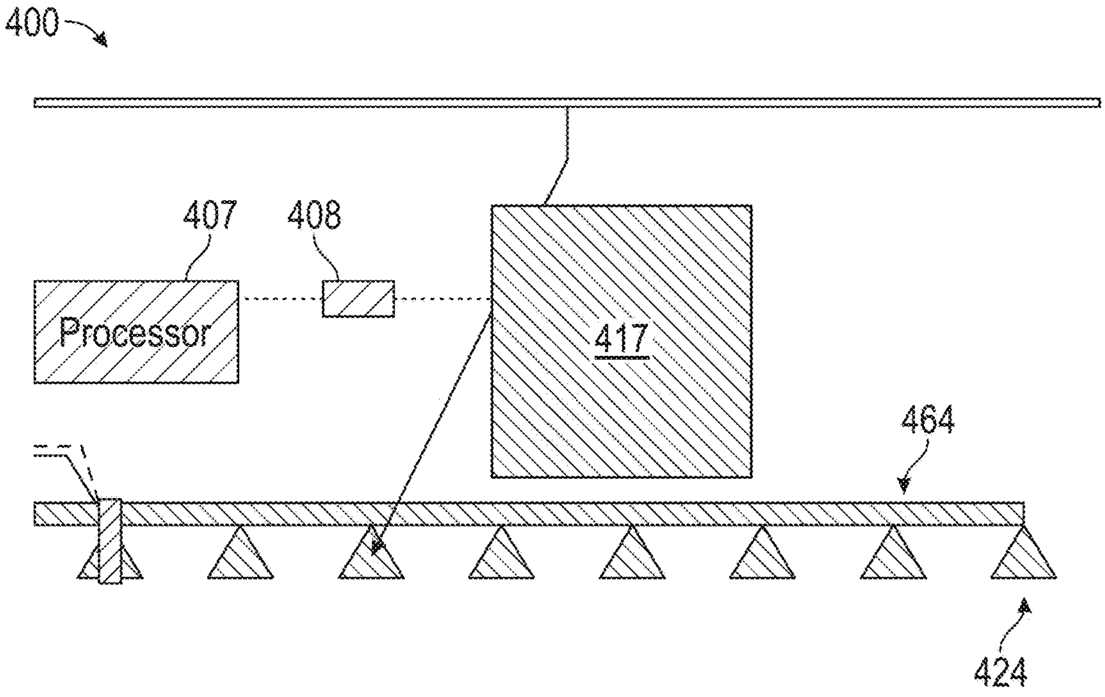
FIG. 5 is a detailed view of one example of an agricultural product assembly according to at least one embodiment of the present application.

FIG. 5 is a detailed view of the one or more agricultural product source 417 and one or more agricultural product nozzle assemblies 424 of the composite nozzle system 400. For example, the one or more agricultural product nozzle assemblies 424 are coupled with an agricultural product boom tube 464, and agricultural product is delivered from the source 417, through the agricultural product boom tube 464 and to the one or more agricultural product nozzle assemblies 424. In another example, the one or more agricultural product sources 417 deliver agricultural product directly to the one or more agricultural product nozzle assemblies 424 without the agricultural product boom tube 464 and thereby reducing intermediate plumbing. For example, the one or more agricultural product source 417 distributes agricultural product to the one or more agricultural product nozzle assemblies 424.

The one or more agricultural product nozzle assemblies 424 include, for example, a modulating nozzle assembly that permits control of one or more flow rate, droplet size, spray pattern or the like. The modulating nozzle assembly includes an actuated orifice place, nozzle fitting, control valve or the like to permit control of characteristics of the sprayed agricultural product. For example, actuation of a nozzle fitting or orifice plate changes the profile of the nozzle orifice permitting control of one or more of flow rate, droplet size or spray pattern. In another example, a control valve, such as a pulse width modulation valve (PWM) permits control of flow rate at the nozzle assembly, and optionally cooperates with the nozzle orifice to control droplet size.

In operation the one or more agricultural product sources 417 deliver agricultural product to the one or more agricultural product nozzle assemblies 424. The one or more agricultural product nozzle assemblies 424 spray the agricultural product with a spray profile having one or more of a specified flow rate, droplet size, spray pattern or the like. In an example including agricultural product nozzle assemblies having one or more modulating elements one or more characteristics of the spray profile are controlled, such as flow rate, droplet size, spray pattern or the like, for instance to achieve a specified spray profile. The one or more agricultural product nozzle assemblies 424 dispenses or distributes agricultural product as, for example, a spray or droplets, at a rate of gallons or liters per minute from each of the one or more carrier nozzle assemblies 424.

Optionally, the one or more agricultural product source 417 is in communication with the processor 407. The processor 407, for example, provides instructions to control delivery (e.g., flow rate) of the agricultural product from the agricultural product source 417 to the agricultural product nozzle assemblies 424, for instance with a control valve, pump or the like. The processor 407, in some examples, is connected with one or more agricultural product sources 417. Optionally, the processor 407 is linked with one or more control units 408 (ECUs) and the processor 407 provides instructions to the units 408 for control of the associated agricultural product source 417. The flow rate of agricultural product is based on one or more of the type of agricultural product (e.g., manufacturer specifications), the agricultural target (set by specification or the operator), field conditions, environmental conditions, or the like.

Figure 6:
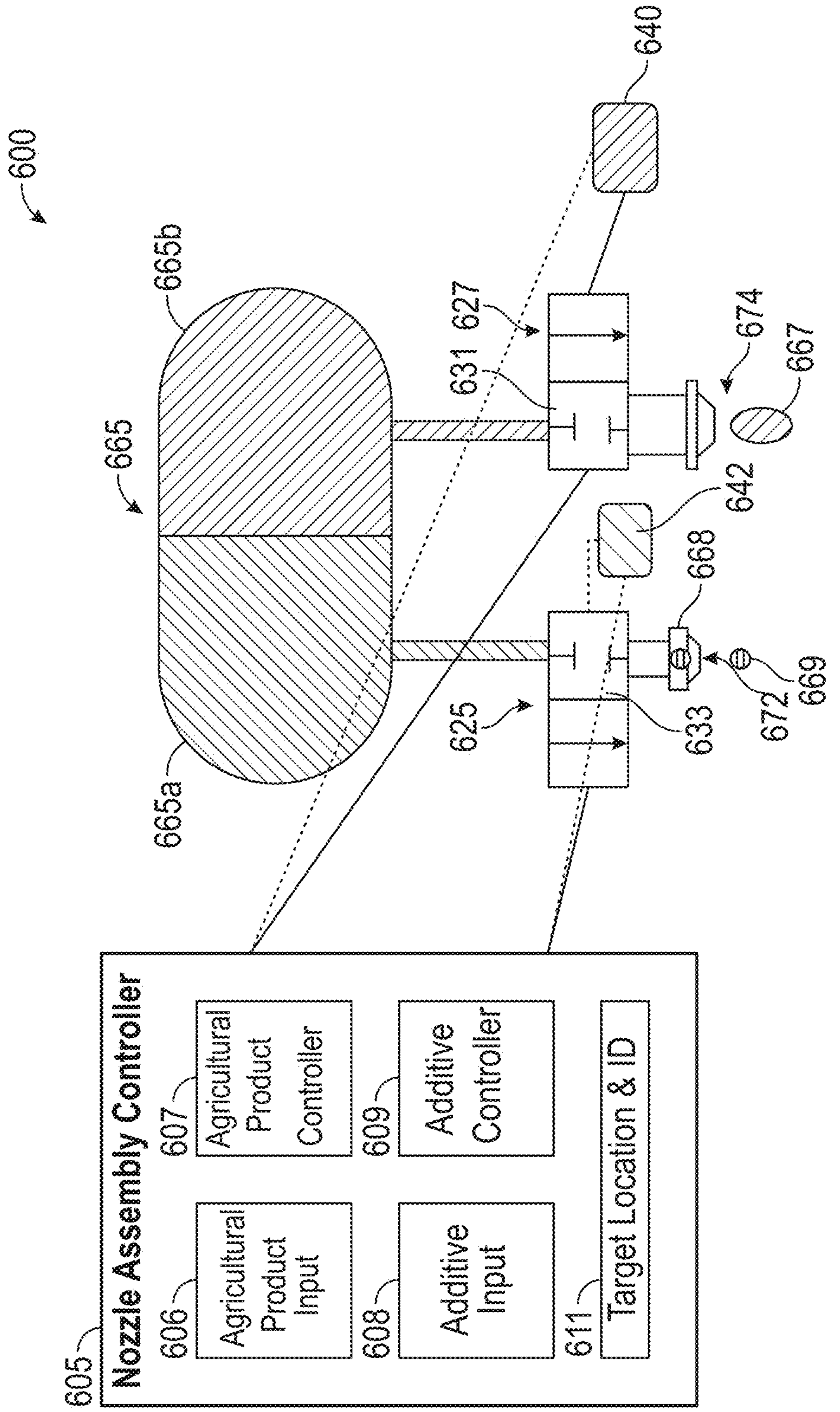
FIG. 6 is a schematic view of one example of a composite nozzle assembly according to at least one embodiment of the present application.

Illustrated in FIG. 6 is a cross section of an example boom tube 665 and a composite nozzle system 600. The boom tube 665 is partitioned to transport multiple agricultural products including a first agricultural product (e.g., water, base agricultural product or the like) and a second agricultural product, such as an additive fluid (e.g., additive as described above relating to FIGS. 3 and 4). In an example, the additive fluid is transported through an additive fluid portion 665*a* and the first agricultural product is transported through an agricultural product portion 665*b* of the boom tube 665. In an example, the composite nozzle system 600 includes plumbing including at least one partitioned (e.g., separated, divided, portioned) boom tube. As shown in FIG. 6, the boom tube 665 is partitioned into channels (e.g., ducts, pathways, portions, or the like) and each channel transports a different fluid. In other examples, the same agricultural product (potentially with different concentrations) is provided through the portions 665*a, b*, to permit supplementing of a base flow of an agricultural product. While the boom tube 665 is partitioned into the channels, in other examples more than two channels are provided with a boom tube 665. In another example, two or more boom tubes, as illustrated in FIGS. 4 and 5, operate in series or in parallel to provide separate flows of the first and second agricultural products.

As shown in FIG. 6, the agricultural product portion 665*b* of the boom tube 665 is positioned in front of the additive fluid portion 665*a*, relative to the direction of travel of the agricultural vehicle (from left to right on the page). The portions 665*a, b* of the boom tube 665 are coupled with nozzle assemblies 625, 627 shown in FIG. 6. Optionally, the additive fluid portion 665*a* and the agricultural product portion 665*b* are coupled with a plurality of nozzle assemblies 625, 627 distributed along the boom tube 665. For example, the additive fluid portion 665*a* is coupled with one or more additive nozzle assemblies 625 (e.g., one or more electrostatic nozzle assemblies for one agricultural product) and the agricultural product portion 665*b* is coupled with one or more agricultural product nozzle assemblies 627 (spraying another agricultural product).

In an example, the one or more agricultural product nozzle assemblies 627 include modulating nozzle assemblies with associated modulating elements that permit the control of one or more of flow rate, droplet size, spray pattern, dispense pressure or the like. One example of a flow modulating element 631 is shown with the agricultural product nozzle assembly 627 shown in FIG. 6. The modulating element 631 (e.g., one or more of a control valve, orifice place, nozzle fitting or the like having an actuator) controls one or more of flow, droplet size or the like. The modulating element 631 includes, but is not limited to, control valves, modulating nozzles, pumps (for one or a plurality of nozzles), nozzle fittings, orifice plates or the like. In an example, the one or more agricultural product nozzle assemblies 627 provides a base spray pattern in a controlled fashion according to operation of the one or more modulating elements 631 of the assemblies 627.

The one or more agricultural product nozzle assemblies 627 is optionally controlled with a nozzle assembly controller 605 shown in FIG. 6. The nozzle assembly controller 605 is in communication with, for example, the agricultural product flow modulating element 631. In an example, an agricultural product input 606 receives user data input or instructions from another controller (e.g., a field computer, sprayer controller or the like). The instructions include one or more settings for flow rate, droplet size or spray pattern, referred to as a spray profile for control of one or more of the nozzle assemblies 625, 627. Optionally, flow rates, droplet size, spray pattern or the like are provided for each of the nozzle assemblies 625, 627. The agricultural product input 606 communicates one or more of the specified flow rate, droplet size, spray pattern or the like to an agricultural product nozzle controller 607. The agricultural product nozzle controller 607 is in communication with the one or more agricultural product nozzle assemblies 627. For example, the agricultural product nozzle controller 607 communicates instructions for operating the agricultural product modulating element 631 provided with the agricultural product nozzle assemblies 627.

In some examples, the nozzle assembly controller 605 is in communication with an agricultural product sensor 640. The agricultural product sensor 640, for example, monitors (detects, senses, measures or the like) one or more of environmental conditions, field conditions, or actual spray profile (e.g., droplet size, spray pattern, spray direction including spray drift or the like). Optionally, the information communicated from the agricultural product sensor 640 to the nozzle assembly controller 605 is provided to the agricultural product fluid nozzle controller 607. The agricultural product nozzle controller 607 provides instructions, for instance in the manner of feedback control instructions to the one or more agricultural product nozzle assemblies 627. In one example, the sensed information is compared at the controller 607 against specified spray profile or another threshold. Differences between thresholds and the sensed information are indicative of a deviation from a specified spray profile and the controller 607 adjusts control of the one or more modulating elements 631 to address the deviation. As one example, the agricultural product sensor 640 observes droplet size of 'coarse'. The agricultural product nozzle controller 607 compares the coarse droplet size with a specified spray profile having a fine droplet size, accordingly there is droplet size deviation. The controller 607 actuates the modulating element 631, such as a nozzle fitting or orifice plate to contract the nozzle orifice 674 to change the actual droplet size sprayed to the fine droplet size.

The additive fluid portion 665*a* of the boom tube 665 transports another agricultural product, such as an additive fluid, to the one or more electrostatic nozzle assemblies 625. Optionally, the additive fluid portion 665*a* of the boom tube 665 is partitioned and a second additive fluid is supplied to the electrostatic nozzle assemblies 625. In one example, the second additive is sprayed separately (e.g., from its own electrostatic nozzle as shown in FIG. 8B). In another example, the second additive and first additive are mixed, and the mixed additives are sprayed from the electrostatic nozzle assemblies 625, for instance as a standalone spray or for fastening to agricultural product droplets. The one or more electrostatic nozzle assemblies 625 include electrostatic nozzles 668. The electrostatic nozzles 668 apply a charge to the agricultural product, and accordingly the sprayed droplets of the agricultural product include the applied charge. In an example including a charged agricultural product, such as an additive, sprayed by the electrostatic nozzle assembly 625 and another agricultural product sprayed from the agricultural product nozzle assembly 627, the charged additive droplets 669 sprayed with the nozzle assembly 625 are attracted to the sprayed agricultural product droplets 667. The charged additive droplets 669 fasten to the agricultural product droplets 667 and are readily transported to an agricultural target.

In an example, one or more additive modulating assemblies 633 include modulating nozzle assemblies with associated modulating elements that permit control of one or more of flow rate, droplet size, spray pattern or the like. One example of an additive modulating element 633 is shown with the additive nozzle assembly 625 shown in FIG. 6. The additive modulating element 633 includes, but is not limited to, a control valve, modulating nozzle, pump or the like that controls one or more of flow, droplet size or the like. The additive modulating element 633, for example, facilitates control of the flow rate of an additive fluid sprayed from the one or more electrostatic nozzle assemblies 625.

The nozzle assembly controller 605 optionally communicates with the one or more modulating elements 633 of the electrostatic nozzle assemblies 625 to control the profile, opening, or the like of an electrostatic nozzle orifice 672. For example, an orifice plate, nozzle fitting or the like as actuated to the spray profile, the additive fluid droplet 669 (e.g., spray profile, droplet size, spray size, or the like). For example, the orifice plate, nozzle fitting or the like or other modulating element 633 is located proximate to the nozzle orifice 672 (including at the orifice 672) of the one or more electrostatic nozzle assemblies 625. The droplets generated at the nozzle orifice 672 are charged. For example, the additive fluid droplets 669, in an example, are charged by an electrostatic mechanism before being dispense or at the time of being dispensed.

The additive modulating element 633 is optionally controlled with the nozzle assembly controller 605 shown in FIG. 6. In an example, the nozzle assembly controller 605 includes an additive input 608. For instance, the additive input 608 receives a user data input or instructions from another controller (e.g., field computer, sprayer controller or the like). The additive input 608 communicates one or more of a specified mixture of additive product, flow rate, droplet size, spray pattern or the like to an additive nozzle controller 609. The additive nozzle controller 609 is in communication with the one or more one or more electrostatic nozzle assemblies 625. For example, the additive nozzle controller 609 communicates instructions for operating the additive modulating element 633.

In some examples, the nozzle assembly controller 605 is in communication with an electrostatic nozzle sensor 642. The electrostatic nozzle sensor 642, for example, monitors (detects, senses, measures or the like) or the like one or more of environmental conditions, field conditions, or actual spray profile (e.g., droplet size, spray pattern, spray direction including spray drift or the like). Optionally, the information communicated from the electrostatic nozzle sensor 642 to the nozzle assembly controller 605 provided to the additive nozzle controller 609. The additive nozzle controller 609 provides instructions for instance in the manner of feedback control instructions to the one or more one or more electrostatic nozzle assemblies 625. In one example, the sensed information is compared at the controller 609 against specified spray profile or other threshold. Differences between thresholds and the sensed information are indicative of a deviation from a specified spray profile and the controller 609 adjusts control of the one or more modulating elements 633 to address the deviation. As one example, the agricultural product sensor 640 observes droplet size of 'coarse'. The additive controller 609 compares the coarse droplet size with a specified spray profile having a fine droplet size, accordingly there is droplet size deviation. The controller 609 actuates the modulating element 633, such as a nozzle fitting or orifice plate to contract the nozzle orifice 672 to change the actual droplet size sprayed to the fine droplet size.

In some examples, the agricultural product nozzle assembly sensor 640 and the electrostatic nozzle assembly sensor 642 are each in communication with the nozzle assembly controller 605. Each of these sensors 640, 642 monitors and communicates data related to one or more of the agricultural target (position, image or the like), a position of the associated nozzle assemblies 625, 627 relative a field, target in a field (e.g., crop, weed, pest, soil or the like) or the like. In examples, the observations of the agricultural product nozzle assembly sensor 640 or electrostatic nozzle assembly sensor 642 are recorded in a target database 611 related to the target location or an identification of the target. In another example the target database 611 provides information to one or more of the agricultural product nozzle controller 607 or the additive nozzle controller 609 to control the associated performance of the nozzle assemblies 625, 627 (e.g., initiation of spraying upon reaching a target, cessation of spraying, specified spray profile or the like).

Figure 7:
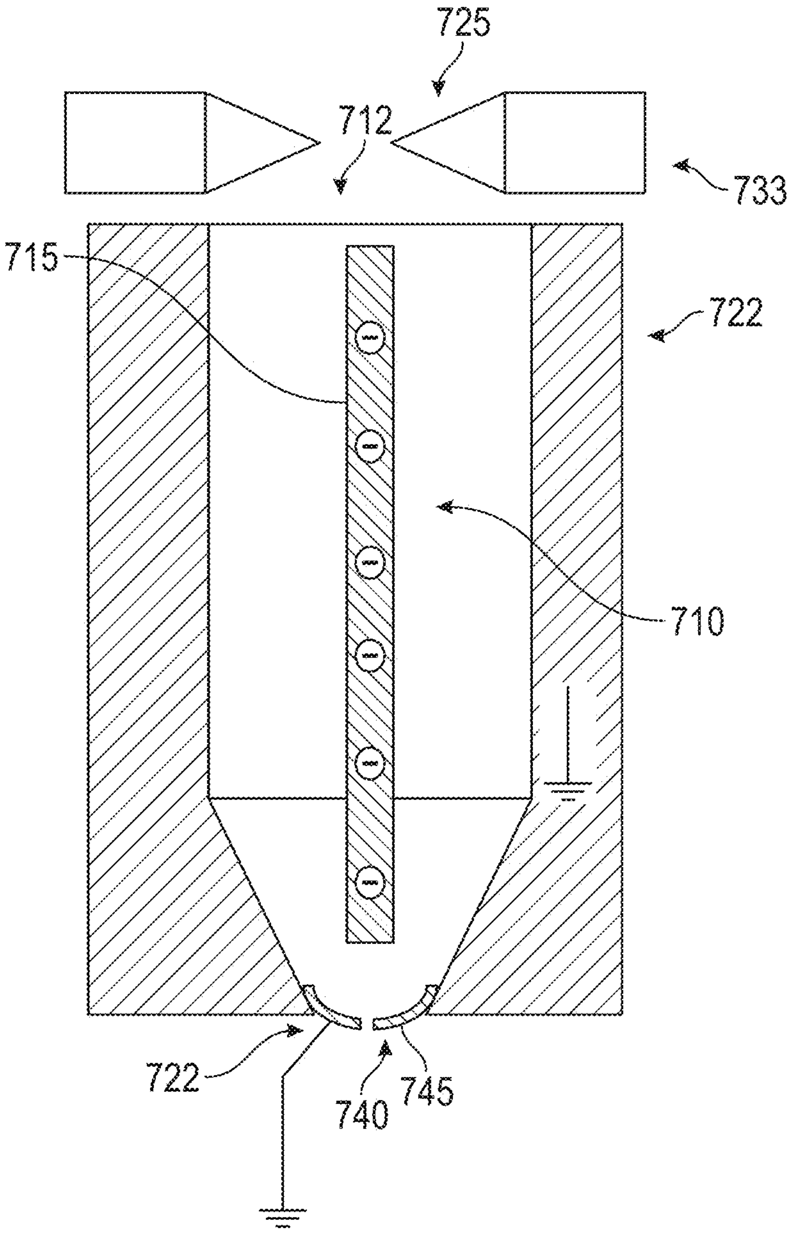
FIG. 7 is a schematic view of one example of an electrostatic nozzle according to at least one embodiment of the present application.

FIG. 7 illustrates a single electrostatic nozzle 725 of the one or more electrostatic nozzles discussed previously regarding FIG. 6. The nozzle passage 710 extends from a receiving opening 712 to the nozzle orifice 772 allowing passage of additive. For example, the additive is supplied from an additive source (such as 665*a* in FIG. 6) to the electrostatic nozzle body 722. Optionally, the additive is supplied to the nozzle passage 710 through a modulating element 733, such as the modulating element 633 of FIG. 6.

In an example, an electrostatic charging element 715 is positioned within a nozzle passage 710. The electrostatic charging element 715 charges the additive (e.g., positively or negatively) passing through nozzle passage 710. The electrostatic charging element 715, for example, subjects the passing additive fluid to a radiated or emitted charge (e.g., positive or negative) and charges the additive. In another example, the electrostatic charge occurs proximate to the nozzle orifice 772.

The electrostatic charging element 715 includes, for example, an electron emitter, an electrode, electron beams, or the like. In various examples, the electrostatic charging element applies or emits charges of between around 1,000 to 25,000 volts. In an example the electrostatic charging element 715 applies a charge of between about 5,000 volts to about 15,000 volts. This charge is transferred, at least in part, to the additive fluid during passage through the nozzle passage 710 or through the nozzle orifice 772.

In an example, the electrostatic nozzle 725 is a configurable nozzle such as those discussed in, for example, U.S. application Ser. No. 16/476,069 which is incorporated in its entirety. The nozzle orifice 772 optionally includes a nozzle plate 745. The nozzle plate 745, in some examples, is a configurable nozzle plate 745 that alters the opening based on one or more of a specified droplet size, spray profile, spray pattern or the like. For example, opening 740 is sized for form the additive droplets that are microns or micrometers in size (e.g., width, radius, diameter or the like). For example, opening 740 in the orifice plate 845 forms additive droplets of around 1 micron to around 50 microns. In another example, the droplets of additive are around 5 microns, such as 4 microns or 6 microns, to around 50 microns, such as 49 microns or 51 microns. The size of the additive droplets is specified by the purpose. The size of the droplets in some examples greater than 50 microns or less than 1 micron.

Figure 8A:
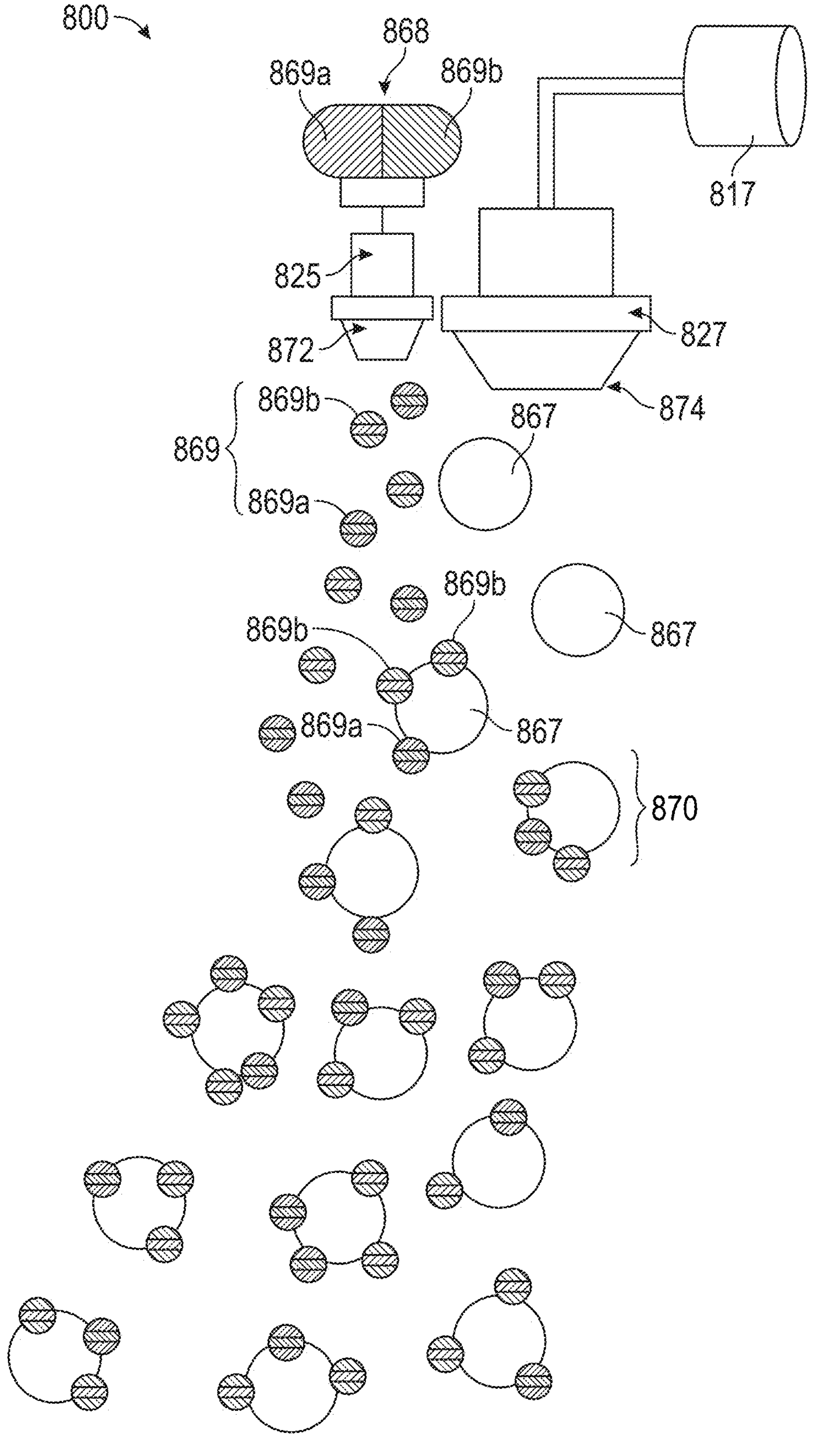
FIG. 8A is a schematic view of another example of a composite nozzle assembly and associated spray profiles according to at least one embodiment of the present application.
Figure 8B:
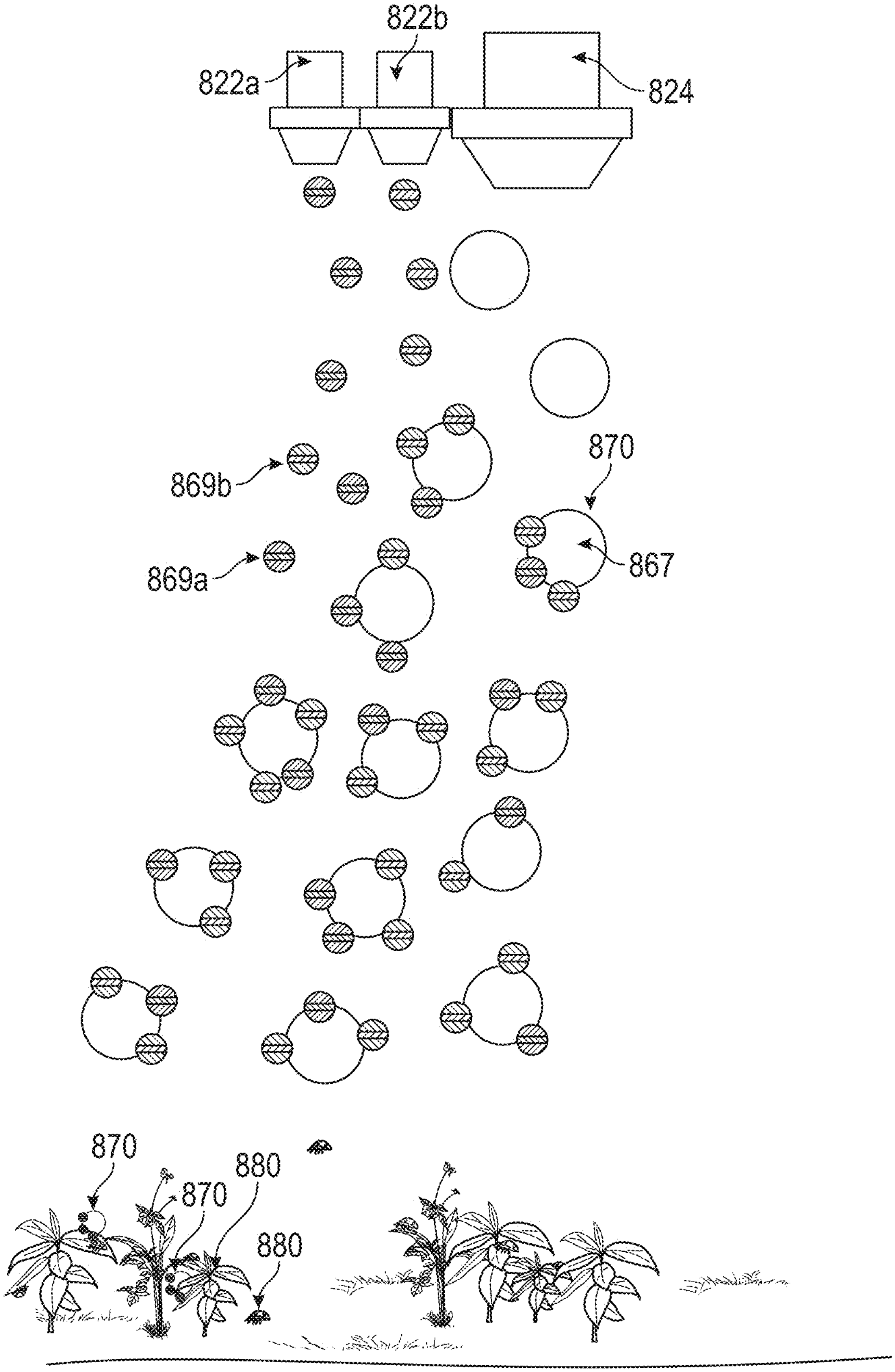
FIG. 8B is a schematic view of an additional example of a composite assembly including multiple electrostatic nozzles and associated spray profiles according to at least one embodiment of the present application.

FIGS. 8A and 8B are illustrative of one or more agricultural product droplets 867 dispensed from one or more agricultural product nozzles and one or more additive droplets 869 dispensed from one or more electrostatic nozzle assemblies 825. FIG. 8A illustrates an electrostatic nozzle system 800 including an electrostatic nozzle assembly 825 and associated additive source 868 and an agricultural product nozzle assembly 827 and associated an agricultural product source 817.

In examples, the additive fluid source 868 includes one or more additive passage, similar to the passages described related to FIG. 4. For example, additive fluid source 868 includes a first additive passage 868*a* and a second additive passage 868*b*. Optionally, the first additive passage 868*a* and the second additive passage 868*b* are separated by a partition extending within the additive fluid source 868. In another example, the first additive passage 868*a* and the second additive passage 868*b* are positioned proximate to each other. Each of the first additive passage 868*a* and the second additive passage 868*b* are in communication with the one or more electrostatic nozzles assemblies 825.

In examples, the first additive dispensed from the first additive passage 868*a* and the second additive dispensed from the second additive passage 868*b* are, for example, mixed within the one or more electrostatic nozzles assemblies 825. In an example, the first and second additives are mixed (e.g., according to a specified concentration) either upstream or proximate to the nozzle orifice 872. In another example, either the first additive is dispensed or the second additive is dispensed without mixing.

Optionally, the additive (either only one additive or a mixture of additives) is charged either positively or negatively upstream of the electrostatic nozzle orifice 872 or proximate to the electrostatic nozzle orifice 872. For example, the one or more additive droplets 869 are dispensed from the nozzle orifice 872 to bond with dispensed agricultural product droplets 867.

The agricultural product 867 is dispensed though the one or more agricultural product nozzles 824. In an example, the agricultural product is transmitted from the agricultural product source 817 to the one or more agricultural product nozzles 824. Optionally, the agricultural product nozzle 827 is dispensed through a modulating element, such as modulating element 631 discussed in FIG. 6. The agricultural product is dispensed from the one or more agricultural product nozzles 824 through an agricultural product nozzle orifice 874.

In examples, the agricultural product nozzle orifice 874 is a configurable nozzle orifice. For example, the configurable nozzle orifice 874 alters the opening in an orifice plate according to a specified droplet size, spray profile, spray pattern or the like. For example, the nozzle orifice 874 is similar to the configurable nozzle of U.S. application Ser. No. 16/476,069 which is incorporated in its entirety.

The agricultural product is, for example, dispensed as carrier droplets 867 having a larger profile than an additive droplet 869. For example, the agricultural product droplets 867 are dispensed having a size (e.g., width, diameter, radius) around 1 millimeter in size, such as 0.5 millimeters to 2 millimeters. In another example, the carrier droplets 867 are dispensed with a diameter larger than 1 millimeter. In examples, a dispensed agricultural product droplet 867 includes droplets of water, a mixture of an agricultural product (e.g., additive) and water, or a base agricultural product. In some examples, the agricultural product droplet 867 is neutral (or in the case of water slightly polar with the hydrogen atoms behaving as positive poles) or an agricultural product droplet 867 having an opposite charge from the additive droplet. The positive poles facilitate ready adhesion and fastening with the electrostatically charged (negative) one or more additive droplets 869.

The additive fluid is dispensed from the additive fluid source 868 through an electrostatic nozzle assembly 825. In examples, the additive fluid is negatively charged as it passes through the electrostatic nozzle body 822. The negatively charged additive is sprayed from the electrostatic nozzle orifice 872. In an example, the one or more electrostatic nozzles assemblies 825 via a nozzle assembly controller, such as nozzle assembly controller 605 regarding FIG. 6, sprays a controlled flow of charged additive droplets 869 toward sprayed agricultural product droplets 867. For example, agricultural product droplets 867 are dispense at the same time as one or more additive droplets 869 (e.g., less than or about 0.5 seconds, about 1 second or the like).

As the charged one or more additive droplets 869 and the agricultural product droplets 867 (e.g., water, carrier, base agricultural product) are each sprayed, the charged one or more additive droplets 869 adhere (e.g., bond, join, fasten, couple) with the agricultural product droplets 867 having an opposite polarity. For example, the charged one or more additive droplets 869 is attracted to (via opposite relative polarities) to the sprayed one or more agricultural product droplet forming composite droplets 870. The charged one or more additive droplets 869 adhere to the agricultural product droplets 867 in the manner of passenger droplets piggybacked, carried or the like to the agricultural product droplets 867.

Optionally, the first additive product 869*a* and the second additive product 869*b* are dispensed as either one at a time, in concert, or as a mixture (e.g., mixed before spraying). In examples the first additive product 869*a* and the second additive product 869*b* are dispensed individually and in an alternative manner.

In FIG. 8B, the first additive product 869*a* and second additive product 869*b* are dispensed through a first additive nozzle 822*a* and a second additive nozzle 822*b* (optionally more than two additive nozzles are supplied). In examples, the first additive nozzle 822*a* dispenses the first additive as a charged additive droplet (e.g., a positive charged droplet or negatively charged droplet) and the second additive nozzle 822*b* dispenses the second additive as a charged additive droplet (e.g., a positive charged droplet or a negatively charged droplet). The first additive nozzle 822*a* and the 822*b* are similar to the additive nozzles previously discussed related to FIGS. 6 and 7. For example, the first additive nozzle 822*a* and the second additive nozzle 822*b* dispense the respective additive fluids in concert (e.g., at the same time, within about 0.5 sections, within about 1.0 seconds, or the like) or at different times (e.g., according to the agricultural target, location on the field, the additive product).

The first additive nozzle 822*a* and the second additive nozzle 822*b* dispense the respective additive droplets to attach (e.g., bond, join) to one or more agricultural product droplets 867 dispensed from the one or more agricultural product nozzles 824. In an example with both the first additive product 869*a* and the second additive product 869*b* dispensed in concert, the quantity of first additive product 869*a* and second additive product 869*b* attached to the agricultural product droplets 867 varies. For example, agricultural product droplets 867 supports more of the first additive product 869*a* than the second additive product 869*b* or alternatively, the agricultural product droplets 867 supports fewer first additive product 869*a* than second additive product 869*b*.

In examples, the charged one or more additive droplet 869 (e.g., one additive or more than one additive) is attracted to and adheres (binds, couples, joins) with the agricultural product droplet 867. After joining with the agricultural product droplet 867, the composite droplet 870 carries the additive product via a "piggybacking" relationship toward an agricultural target (e.g., row, zone, crop, plant, weed, pest or the like). The composite droplet 870 is attracted to agricultural targets 880 in an enhanced manner relative to neutral or uncharged droplets. This enhanced adhesion causes attraction of the composite droplets 870 (for example as compared to additive droplets normally subject to wind drift) towards the agricultural targets 880 and facilitates adhesion to the agricultural targets 880. The attraction and adhesion of one or more of the first additive product 869*a* and second additive product 869*b* reduces errant travel or distribution of the one or more additive droplets 869 (e.g., to non-designated targets, adjacent fields or the like).

Charging the one or more additive droplets 869, for example, assists with targeted application of the composite droplet 870 to the targeted agricultural targets 880 (e.g., grounded targets). In an example, charged one or more additive droplets 869 adhere to the surface of an agricultural product droplets 867 form composite droplets 870 that are sized to allow the charged one or more additive droplets 869, to reach the underside of the agricultural targets 880 such as downward facing leaves.

Figure 9:
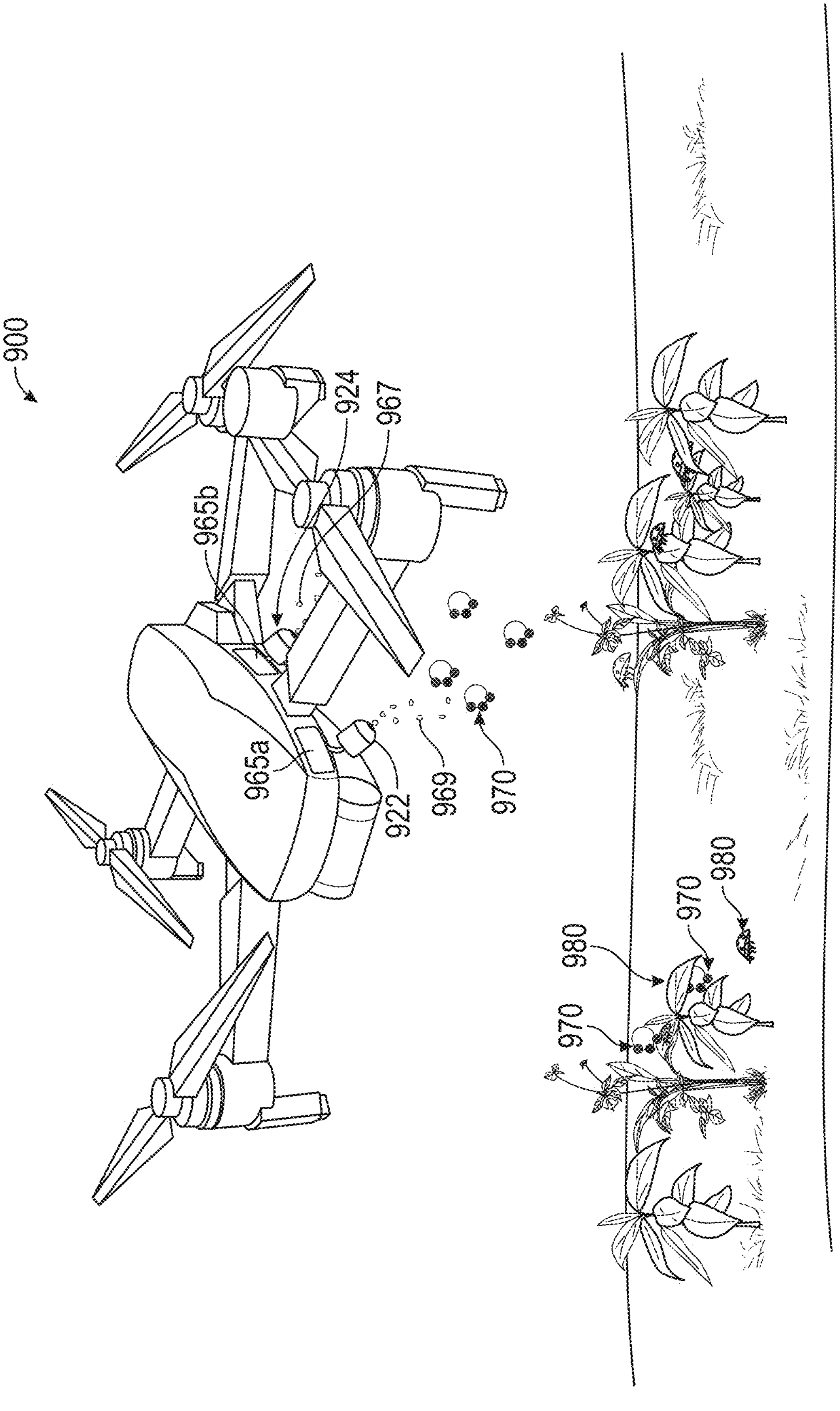
FIG. 9 is a perspective view of an example of an agricultural unmanned aerial vehicle with a composite nozzle system according to at least one embodiment of the present application.

FIG. 9 illustrates an agricultural unmanned aerial vehicle 910 including one or more additive nozzles 922 and one or more agricultural product nozzles 924. In an example, the composite nozzle system 900 is coupled with the agricultural unmanned aerial vehicle 910. For example, the composite nozzle system 900 is coupled with an underside, or field facing, portion of the agricultural unmanned aerial vehicle 910. In an example using the agricultural unmanned aerial vehicle 910 an additive fluid source 965*a* and an agricultural product source 965*b* are coupled (e.g., attached on an exterior surface or housed) with the agricultural unmanned aerial vehicle 910.

The additive fluid source 965*a* is, for example, similar to the concept of the additive fluid source discussed related to FIGS. 4-8. However, the additive fluid source 965*a* is, for example, a reduced size to fit the profile of the agricultural unmanned aerial vehicle 910. Similarly, the agricultural product source 965*b* is, for example, a reduced size compared to the agricultural product source previously discussed related to FIGS. 4-9. In examples, both the additive fluid source 965*a* and the agricultural product source 965*b* reduce the plumbing required to transmit the additive fluid and the agricultural product to the respective nozzles.

In examples, the additive fluid source 965*a* is directly coupled (e.g., immediately next to or proximate to) with the one or more additive nozzles 922. In some examples, there is an additive fluid source 965*a* associated with each of the one or more additive nozzles 922. In other options, there is one additive fluid source 965*a* coupled with more than one of the one or more additive nozzles 922.

In an example, the agricultural product source **965*b* is directly coupled (e.g., immediately next to or proximate to) with the one or more agricultural product nozzles 924. Optionally, there is one agricultural product source 965*b* coupled with each of the one or more agricultural product nozzles 924. In another option, there is one agricultural product source 965*b* coupled with more than one of the one or more agricultural product nozzles 924**.

The one or more additive nozzles 922 and the one or more agricultural product nozzles 924 are similar to the additive nozzles and agricultural product nozzles, respectively, discussed previously. In examples, at least one of the one or more additive nozzles 922 and the one or more agricultural product nozzles 924 includes modulating or configurable nozzles, for example, similar to the nozzles and nozzle assemblies discussed in U.S. application Ser. No. 16/476,069 which is incorporated in its entirety.

In a further example, the one or more additive nozzles 922 includes and electrostatic application system, such as the electrostatic charging element 715, discussed related to FIG. 7. In examples, the one or more additive nozzles 922 is an electrostatic nozzle that provides a charge, either positive or negative, to the additive fluid passing through the one or more additive nozzles 922. The additive fluid that passes through the one or more additive nozzles 922 is dispensed as a charged additive fluid, as discussed related to FIG. 8A or FIG. 8B.

The charged additive fluid is then, for example, dispensed from the one or more additive nozzles 922 as a charged additive droplet 969. The charged additive droplet 969 is similar to the charged additive droplet 969 discussed previously related to FIGS. 8A and 8B. The charged additive droplet 969, upon dispensing from the one or more additive nozzles 922 adheres to an agricultural product droplet 967. When the charged additive droplet 969 adheres to the agricultural product droplet 967, the 969 is carried, or piggybacks on to the agricultural product droplet 967 and is a composite droplet 970. The composite droplet 970, as described, for example, related to FIGS. 8A and 8B is attracted to the agricultural target 980.

When using an agricultural unmanned aerial vehicle 910, the agricultural unmanned aerial vehicle 910, for example flies over the agricultural target 980 to dispense the composite droplet 970. The composite droplet 970 then adheres to the agricultural target 980.

Figure 10A:
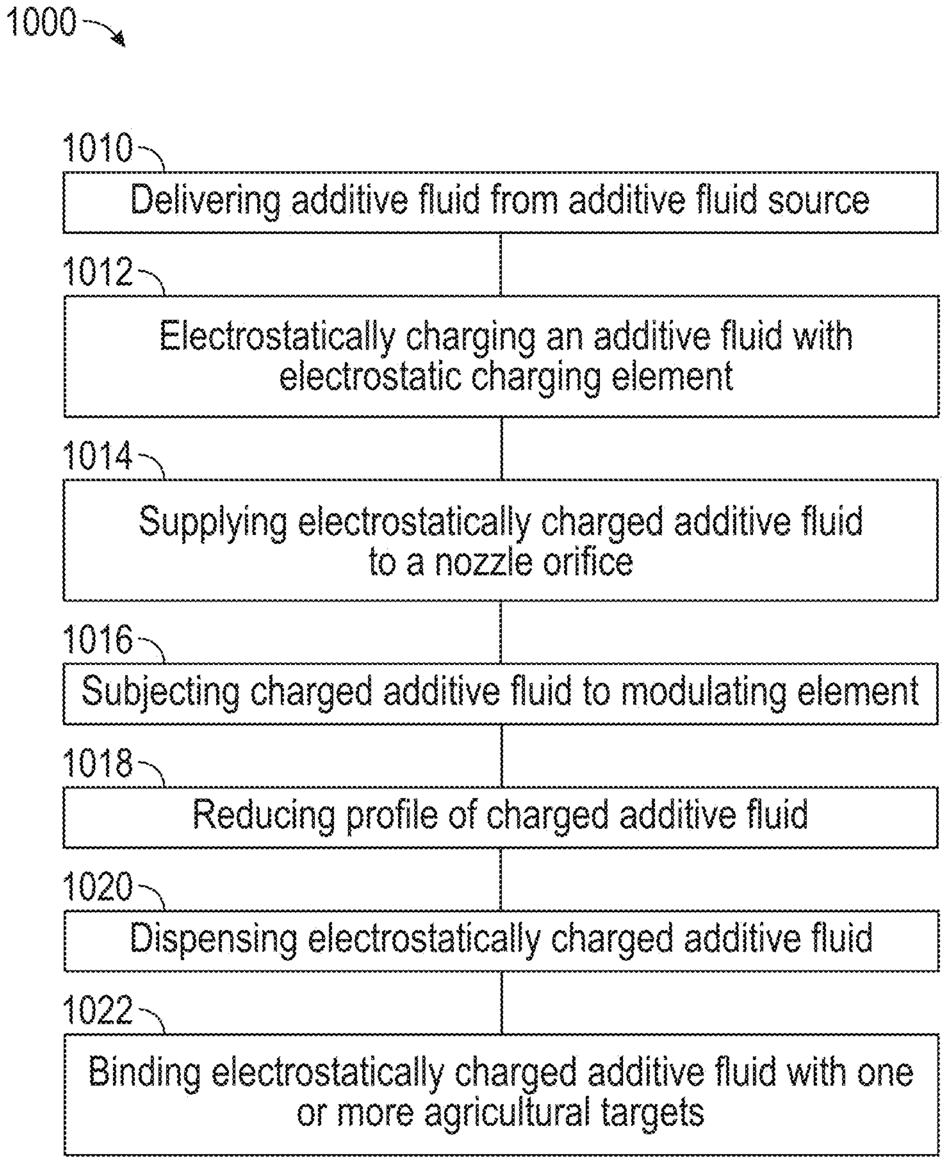
FIGS. 10A and 10B illustrate an example method of adhering an electrostatically charged additives according to at least one embodiment of the present application.

A method of treating one or more agricultural targets by adhering electrostatically charged additive fluid 1000 is described in FIG. 10A. For example, the additive fluid is delivered from the additive fluid source, as in step 1010. The additive fluid source is optionally directly coupled (e.g., immediately next to or proximate to) with an additive nozzle assembly. The additive fluid source directly coupled (e.g., immediately next to or proximate to) with the additive nozzle assembly to, for example, reduce plumbing or the overall profile of the system.

The additive fluid then passes through an electrostatic nozzle assembly. The electrostatic nozzle assembly includes an electrostatic charging element. The additive fluid is charged, positive or negatively, with, for example, the electrostatic charging element, as step 1012.

The electrostatically charged additive fluid is then dispensed to a nozzle orifice as in step 1014. Upon reaching the nozzle orifice, the electrostatically charged additive fluid is subjected to a modulating element, as in step 1016. The modulating element for example is proximate to the nozzle orifice.

The modulating element, for example, reduces the profile of the charged additive fluid, as in step 1018. In an example, the profile of the additive fluid is reduced to a specified droplet size, a specified spray pattern, or a profile. Optionally, the modulating element is an orifice plate, valve, or the like.

The charged additive fluid having an optionally reduced profile is then dispensed (e.g., sprayed) from the electrostatic nozzle, as in step 1020. In an example, the charged additive fluid is, for example, sprayed proximate to, such as towards, an agricultural target, as in step 1022. The charged additive fluid, for example adheres with one or more agricultural targets.

Figure 10B:
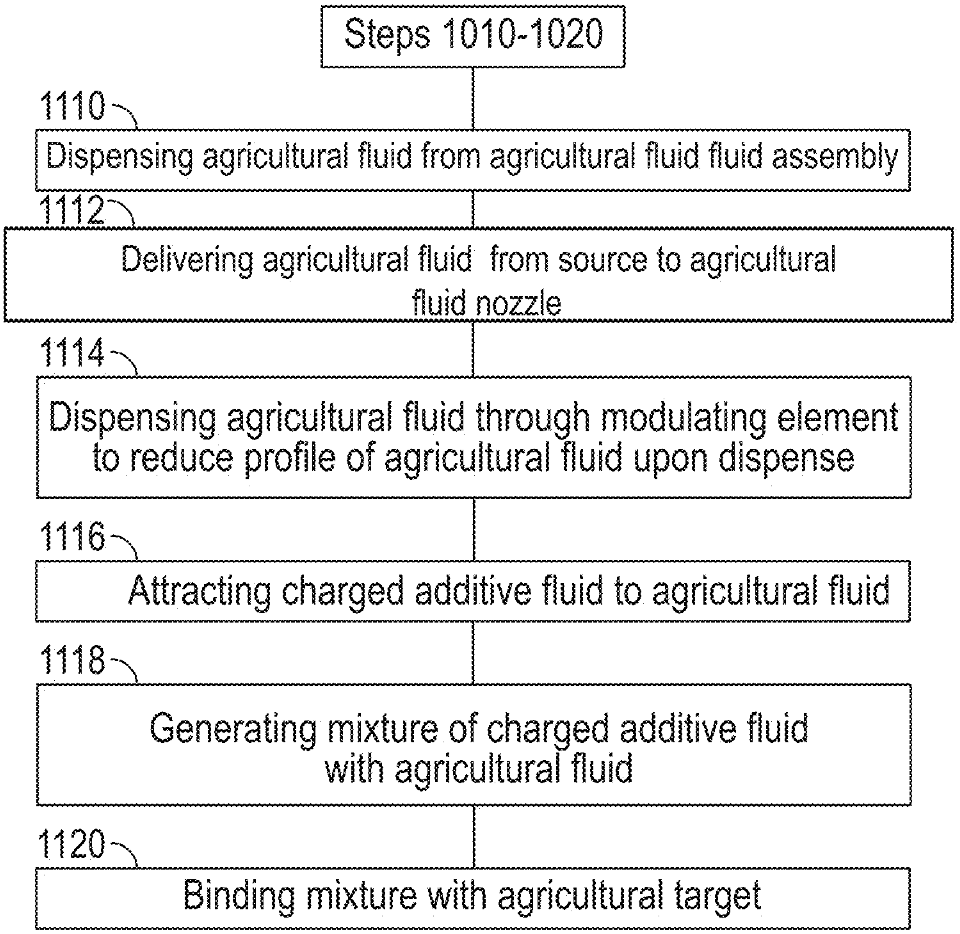

Illustrated in FIG. 10B is a method that optionally includes the steps 1010-1020 from FIG. 10A. The steps in FIG. 10A are optionally performed in parallel or series to the steps in FIG. 10B. In an example, steps 1010 through 1020 from FIG. 10A are incorporated into FIG. 10B.

In step 1110, the agricultural product (e.g., water, base agricultural product, carrier or the like) is dispensed from an agricultural product assembly. The agricultural product is, for example, dispense in concert with the distribution of the additive fluid from the additive fluid source.

The agricultural product is then, for example, dispensed from the agricultural product source to the agricultural product nozzle, as in step 1112. The agricultural product nozzle is an example of a device implemented to regulate the flow of the agricultural product. For example, the agricultural product flow is optionally reduced or increased according to the specified purpose.

The agricultural product is then, for example, sprayed from the agricultural product nozzle through a modulating element, as in step 1114. The agricultural product is dispensed through the modulating element to reduce the profile of the agricultural product. For example, the modulating element reduces the size of droplets, spray pattern or spray profile, or the like.

After the agricultural product is dispensed through the modulating element, the agricultural product is dispensed proximate to the additive fluid nozzle. The charged additive fluid is, for example attracted to the dispensed agricultural product, as in step 1116.

The dispensed additive fluid, as from step 1020, for example, adheres or bonds with the dispensed agricultural product, as in step 1118. The additive fluid, for example, adheres to the agricultural product to piggyback or adhere to surfaces of the agricultural product. The additive fluid adhered with the agricultural product forms, for example, a composite droplet.

The composite droplet, for example, is attracted to an agricultural target. The composite droplet then adheres to with the agricultural target, as in step 1120.

Various Notes and Aspects

Aspect 1 can include subject matter such as can include an electrostatic nozzle system for agricultural spraying comprising: at least one additive fluid source configured to contain an additive fluid; and an electrostatic nozzle assembly in communication with the at least one additive fluid source, the electrostatic nozzle assembly configured to dispense the additive fluid, the electrostatic nozzle assembly including: an electrostatic charging element configured to electrostatically charge the additive fluid; at least one modulating element configured to control at least one of a flow rate or a pressure of the additive fluid; a nozzle orifice in communication with the at least one modulating element, the nozzle orifice configured to dispense the additive fluid; and an orifice plate proximate to the orifice, the orifice plate configured to regulate a profile of the additive fluid, that has been electrostatically charged; wherein the at least one additive is electrostatically charged with the electrostatic charging element.

Aspect 2 can include or, can optionally be combined with the subject matter of Aspect 1, to optionally include the profile of the additive fluid includes a spray profile including droplet size.

Aspect 3 can include, or can optionally be combined with the subject matter of one or any combination of Aspects 1 or 2 to optionally include the droplet size includes diameters between around 5 microns and around 20 microns.

Aspect 4 can include, or can optionally be combined with the subject matter of one or any combination of Aspects 1-3 to optionally include a first additive fluid source configured to contain a first additive fluid; a second additive fluid source configured to contain a second additive fluid; and wherein the at least one modulating element of the electrostatic nozzle assembly includes: a first modulating element configured to control at least one of a first flow rate or a first pressure of the first additive fluid; and a second modulating element configured to control at least one of a second flow rate or second pressure of the second additive fluid.

Aspect 5 can include, or can optionally be combined with the subject matter of one or any combination of Aspects 1-4 to optionally include a nozzle assembly controller, the nozzle assembly controller configured to control at least one of the at least one modulating element, the electrostatic charging element, a nozzle assembly position, and the orifice plate.

Aspect 6 can include, or can optionally be combined with the subject matter of Aspects 1-5 to optionally include the nozzle assembly controller is in communication with a sensor configured to monitor agricultural characteristics; wherein the nozzle assembly controller is configured to control one or more of the at least one modulating element, the electrostatic charging element, the nozzle assembly position, and the nozzle orifice based on the monitored agricultural characteristics.

Aspect 7 can include, or can optionally be combined with the subject matter of Aspects 1-6 to optionally include the sensor includes a flow meter.

Aspect 8 can include, or can optionally be combined with the subject matter of Aspects 1-7 to optionally include the additive fluid; wherein the additive fluid is one of an herbicide, pesticide or fertilizer.

Aspect 9 can include, or can optionally be combined with the subject matter of Aspects 1-8 to optionally include the nozzle assembly is configured to be coupled with a sprayer boom.

Aspect 10 can include, or can optionally be combined with the subject matter of Aspects 1-9 to optionally include the at least one additive fluid source is coupled with the electrostatic nozzle assembly.

Aspect 11 can include, or can optionally be combined with the subject matter of Aspects 1-10 to optionally include the at least one additive fluid source is remotely coupled with the electrostatic nozzle assembly.

Aspect 12 can include, or can optionally be combined with the subject matter of Aspects 1-11 to optionally include the electrostatic charging element is proximate to the nozzle orifice.

Aspect 13 can include, or can optionally be combined with the subject matter of Aspects 1-12 to optionally include the electrostatic charging element is proximate to a nozzle orifice.

Aspect 13 can include, or can optionally be combined with the subject matter of Aspects 1-12 to optionally include the electrostatic charging element is disposed between a dispense opening of the additive source and a nozzle orifice.

Aspect 14 can include, or can optionally be combined with the subject matter of Aspects 1-13 to optionally include the electrostatic charging element radiates a charge between 5,000 volts and 15,000 volts.

Aspect 16 can include subject matter such as can include a composite nozzle system for agricultural spraying comprising: an agricultural product assembly including: an agricultural product source configured to contain an agricultural product; a agricultural product nozzle assembly in communication with the agricultural product source, the agricultural product nozzle assembly configured to dispense the agricultural product from an agricultural product nozzle orifice; and an electrostatic additive fluid assembly including: at least one additive fluid source configured to contain an additive fluid; an electrostatic charging element configured to electrostatically charge the additive fluid; at least one electrostatic nozzle assembly in communication with the at least one additive fluid source, the at least one electrostatic nozzle assembly including: at least one modulating element configured to control application of the additive; and a nozzle in communication with the at least one modulating element, the nozzle configured to dispense the additive fluid, the dispensed additive fluid having an electrostatic charge; wherein the dispense additive fluid having the electrostatic charge is dispensed from the nozzle proximate to the agricultural product nozzle; wherein the dispensed additive fluid having the electrostatic charge is configured to adhere with the agricultural product according to the electrostatic charge.

Aspect 17 can include, or can optionally be combined with the subject matter of Aspect 16, to optionally include the electrostatic charging element configured to electrostatically charge the additive fluid includes: the electrostatic charging element electrostatically charging droplets of the additive fluid.

Aspect 18 can include, or can optionally be combined with the subject matter of one or any combination of Aspects 16 or 17 to optionally include the electrostatic nozzle assembly is coupled with the additive fluid source.

Aspect 19 can include, or can optionally be combined with the subject matter of one or any combination of Aspects 16-18 to optionally include the electrostatic charging element is proximate to an orifice of the electrostatic nozzle.

Aspect 20 can include, or can optionally be combined with the subject matter of one or any combination of Aspects 16-19 to optionally include the electrostatic charging element is proximate to a dispense opening of the additive source.

Aspect 21 can include, or can optionally be combined with the subject matter of one or any combination of Aspects 16-20 to optionally include the electrostatic charging element radiates a charge between 5,000 volts and 15,000 volts.

Aspect 22 can include, or can optionally be combined with the subject matter of one or any combination of Aspects 16-21 to optionally include an orifice; and an orifice plate proximate to the orifice, the orifice plate configured to regulate a profile of the additive fluid that has been electrostatically charged.

Aspect 23 can include, or can optionally be combined with the subject matter of one or any combination of Aspects 16-22 to optionally include the at least one modulating element further includes: a first modulating element configured to control a first flow rate of a first additive fluid; and a second modulating element configured to control a second flow rate of a second additive fluid.

Aspect 24 can include, or can optionally be combined with the subject matter of one or any combination of Aspects 16-23 to optionally include the agricultural product assembly and the electrostatic nozzle assembly are coupled to a sprayer boom; and wherein the agricultural product source is remote from the sprayer boom and in fluid communication with the agricultural product nozzle; wherein the additive fluid source is mechanically coupled with the electrostatic nozzle assembly.

Aspect 25 can include, or can optionally be combined with the subject matter of one or any combination of Aspects 16-24 to optionally include the agricultural product source dispenses fluid through a sprayer boom at a rate of gallons per minute and the additive source dispenses fluid through the electrostatic nozzle assembly at a rate of ounces per minute.

Aspect 26 can include, or can optionally be combined with the subject matter of one or any combination of Aspects 16-25 to optionally include the agricultural product nozzle dispenses agricultural product as droplets larger in profile than the profile of droplets of additive fluid dispensed from the electrostatic nozzle.

Clause 27. The composite nozzle system of clause 16, wherein the additive fluid source is proximate to the electrostatic nozzle assembly.

Aspect 28 can include, or can optionally be combined with the subject matter of one or any combination of Aspects 16-27 to optionally include the additive fluid source is connected to the electrostatic nozzle.

Aspect 29 can include, or can optionally be combined with the subject matter of one or any combination of Aspects 16-28 to optionally include a controller in communication with the at least one modulating element; wherein the at least one modulating element is configured to regulate at least one of flow rate, spray pattern, droplet size or dispense pressure of the additive fluid.

Aspect 30 can include, or can optionally be combined with the subject matter of one or any combination of Aspects 16-29 to optionally include a nozzle assembly controller in communication with at least one of the agricultural product source, the agricultural product nozzle assembly, the additive fluid source and the additive nozzle assembly.

Aspect 31 can include, or can optionally be combined with the subject matter of one or any combination of Aspects 16-30 to optionally include a first nozzle in communication with a first modulating element, the first nozzle configured to dispense droplets of a first additive fluid having a first electrostatic charge; and a second nozzle in communication with a second modulating element, the second nozzle configured to dispense droplets of a second additive fluid having a second electrostatic charge.

Aspect 32 can include subject matter such as can include a method of treating one or more agricultural targets with an additive fluid comprising: delivering the additive fluid from an additive source to an electrostatic nozzle assembly; electrostatically charging the additive fluid, including: subjecting the additive fluid to an electrostatic charging mechanism; and generating an electrostatically charged additive; subjecting the additive fluid or the electrostatically charged additive fluid to a modulating element including: reducing a profile of the additive fluid or the electrostatically charged additive fluid as it passes through the modulating element; dispensing the electrostatically charged additive fluid from the electrostatic nozzle assembly; and adhering the electrostatically charged additive fluid with the one or more agricultural targets.

Aspect 33 can include, or can optionally be combined with the subject matter of Aspect 32, to optionally include dispensing an agricultural product from an agricultural product nozzle assembly including: delivering the agricultural product from an agricultural product source to an agricultural product nozzle; and subjecting the agricultural product to a modulating element including: supplying the agricultural product though the modulating element; and reducing the profile of the agricultural product; dispensing the agricultural product from the agricultural product nozzle assembly; attracting the electrostatically charged fluid to the agricultural product; and adhering the electrostatically charged additive fluid to a portion of the agricultural product.

Aspect 34 can include, or can optionally be combined with the subject matter of one or any combination of Aspects 32 or 33 to optionally include reducing the profile of the additive fluid or the electrostatically charged additive fluid includes forming droplets of additive fluid or electrostatically charged additive fluid.

Aspect 35 can include, or can optionally be combined with the subject matter of one or any combination of Aspects 32-34 to optionally include electrostatically charging the additive fluid includes: subjecting the additive fluid to the electrostatically charging mechanism proximal to an orifice of the electrostatic nozzle assembly.

Aspect 36 can include, or can optionally be combined with the subject matter of one or any combination of Aspects 32-35 to optionally include adhering at least one droplet of electrostatically charged additive fluid with at least one droplet of agricultural product proximate to an orifice of the electrostatic nozzle.

Aspect 37 can include, or can optionally be combined with the subject matter of one or any combination of Aspects 32-36 to optionally include dispensing agricultural product droplets with a larger profile than additive fluid droplets.

Aspect 38 can include, or can optionally be combined with the subject matter of one or any combination of Aspects 32-37 to optionally include applying a charge of between around 5,000 volts and 15,000 volts to the additive fluid or additive fluid droplets.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electrostatic nozzle system for agricultural spraying comprising:

at least one additive fluid source configured to contain an additive fluid; and an electrostatic nozzle assembly in communication with the at least one additive fluid source, the electrostatic nozzle assembly configured to dispense an electrostatically charged additive fluid, the electrostatic nozzle assembly including:

an electrostatic charging element configured to electrostatically charge the additive fluid, the electrostatic charging element configured to form an electrostatically charged additive fluid within the electrostatic nozzle assembly;

at least one modulating element configured to control at least one of a flow rate or a pressure of the additive fluid flowing toward the electrostatic charging element;

a nozzle orifice in communication with the at least one modulating element, the nozzle orifice configured to dispense the electrostatically charged additive fluid;

an orifice plate proximate to the nozzle orifice, the orifice plate configured to form droplets of electrostatically charged additive fluid and the orifice plate is configured to regulate a profile of the electrostatically charged additive fluid; and wherein the electrostatically charged additive fluid is formed upstream of the nozzle orifice.

2. The electrostatic nozzle system of claim 1, wherein the profile of the additive fluid includes a spray profile including droplet size.

3. The electrostatic nozzle system of claim 2, wherein the droplet size includes diameters between 5 microns and 20 microns.

4. The electrostatic nozzle system of claim 1, wherein the at least one additive fluid source containing the additive fluid includes:

a first additive fluid source configured to contain a first additive fluid;

a second additive fluid source configured to contain a second additive fluid; and wherein the at least one modulating element of the electrostatic nozzle assembly includes:

a first modulating element configured to control at least one of a first flow rate or a first pressure of the first additive fluid; and a second modulating element configured to control at least one of a second flow rate or second pressure of the second additive fluid.

5. The electrostatic nozzle system of claim 1, further comprising a nozzle assembly controller, the nozzle assembly controller configured to control at least one of the at least one modulating element, the electrostatic charging element, a nozzle assembly position, and the orifice plate.

6. The electrostatic nozzle system of claim 5, wherein the nozzle assembly controller is in communication with a sensor configured to monitor agricultural characteristics;

wherein the nozzle assembly controller is configured to control one or more of the at least one modulating element, the electrostatic charging element, the nozzle assembly position, and the nozzle orifice based on the agricultural characteristics monitored by the sensor.

7. The electrostatic nozzle system of claim 6, wherein the sensor includes a flow meter.

8. The electrostatic nozzle system of claim 1, comprising:
the additive fluid;
wherein the additive fluid is one of an herbicide, pesticide or fertilizer.

9. The electrostatic nozzle system of claim 1, wherein the nozzle assembly is configured to be coupled with a sprayer boom.

10. The electrostatic nozzle system of claim 1, wherein the at least one additive fluid source is coupled with the electrostatic nozzle assembly.

11. The electrostatic nozzle system of claim 1, wherein the at least one additive fluid source is remotely coupled with the electrostatic nozzle assembly.

12. The electrostatic nozzle system of claim 1, wherein the electrostatic charging element is upstream of the nozzle orifice.

13. The electrostatic nozzle system of claim 1, wherein the electrostatic charging element is proximate to the nozzle orifice.

14. The electrostatic nozzle system of claim 1, wherein the electrostatic charging element is disposed between a dispense opening of the additive source and a nozzle orifice.

15. The electrostatic nozzle system of claim 1, wherein the electrostatic charging element radiates a charge between 5,000 volts and 15,000 volts.

16. A composite nozzle system for agricultural spraying comprising:
an agricultural product assembly including:
an agricultural product source configured to contain an agricultural product;
an agricultural product nozzle assembly in communication with the agricultural product source, the agricultural product nozzle assembly configured to dispense the agricultural product from an agricultural product nozzle orifice; and
an electrostatic additive fluid assembly including:
at least one additive fluid source configured to contain an additive fluid;
an electrostatic charging element configured to electrostatically charge the additive fluid;
at least one electrostatic nozzle assembly in communication with the at least one additive fluid source, the at least one electrostatic nozzle assembly including:
at least one modulating element configured to control application of the additive; and
a nozzle in communication with the at least one modulating element, the nozzle configured to dispense the additive fluid, the additive fluid dispensed from the nozzle having an electrostatic charge;
wherein the additive fluid dispensed from the nozzle having the electrostatic charge is dispensed from the nozzle proximate to the agricultural product nozzle;
wherein the additive fluid dispensed from the nozzle having the electrostatic charge is configured to adhere with the agricultural product according to the electrostatic charge.

17. The composite nozzle system of claim 16, wherein the electrostatic charging element configured to electrostatically charge the additive fluid includes:
the electrostatic charging element electrostatically charging droplets of the additive fluid.

18. The composite nozzle system of claim 16, wherein the electrostatic nozzle assembly is coupled with the additive fluid source.

19. The composite nozzle system of claim 16, wherein the electrostatic charging element is proximate to an orifice of the electrostatic nozzle.

20. The composite nozzle system of claim 16, wherein the electrostatic charging element is proximate to a dispense opening of the additive source.

21. The composite nozzle system of claim 16, wherein the electrostatic charging element radiates a charge between 5,000 volts and 15,000 volts.

22. The composite nozzle system of claim 16, wherein the electrostatic nozzle includes:
an electrostatic nozzle orifice; and
an electrostatic nozzle orifice plate proximate to the electrostatic nozzle orifice, the electrostatic nozzle orifice plate configured to regulate a profile of the additive fluid that has been electrostatically charged.

23. The composite nozzle system of claim 16, wherein the at least one modulating element further includes:
a first modulating element configured to control a first flow rate of a first additive fluid; and
a second modulating element configured to control a second flow rate of a second additive fluid.

24. The composite nozzle system of claim 16, wherein the agricultural product assembly and the electrostatic nozzle assembly are coupled to a sprayer boom; and
wherein the agricultural product source is remote from the sprayer boom and in fluid communication with the agricultural product nozzle;
wherein the additive fluid source is mechanically coupled with the electrostatic nozzle assembly.

25. The composite nozzle system of claim 16, wherein the agricultural product source dispenses fluid through a sprayer boom at a rate of gallons per minute and the additive source dispenses fluid through the electrostatic nozzle assembly at a rate of ounces per minute.

26. The composite nozzle system of claim 16, wherein the agricultural product nozzle dispenses agricultural product as droplets larger in profile than the profile of droplets of additive fluid dispensed from the electrostatic nozzle.

27. The composite nozzle system of claim 16, wherein the additive fluid source is proximate to the electrostatic nozzle assembly.

28. The composite nozzle system of claim 16, wherein the additive fluid source is connected to the electrostatic nozzle.

29. The composite nozzle system of claim 16, further comprising a controller in communication with the at least one modulating element;
wherein the at least one modulating element is configured to regulate at least one of flow rate, spray pattern, droplet size or dispense pressure of the additive fluid.

30. The composite nozzle system of claim 16, further comprising a nozzle assembly controller in communication with at least one of the agricultural product source, the agricultural product nozzle assembly, the additive fluid source and the additive nozzle assembly.

31. The composite nozzle system of claim 16, wherein the electrostatic additive assembly includes:
a first nozzle in communication with a first modulating element, the first nozzle configured to dispense droplets of a first additive fluid having a first electrostatic charge; and
a second nozzle in communication with a second modulating element, the second nozzle configured to dispense droplets of a second additive fluid having a second electrostatic charge.

32. A method of treating one or more agricultural targets with an additive fluid comprising:

delivering the additive fluid from an additive source to an electrostatic nozzle assembly;

electrostatically charging the additive fluid, including:

charging the additive fluid to an electrostatic charging mechanism within the nozzle assembly; and generating an electrostatically charged additive;

delivering the electrostatically charged additive fluid through a modulating element including:

reducing a profile of the electrostatically charged additive fluid as it passes through the modulating element; wherein reducing a profile includes forming droplets of electrostatically charged additive fluid;

dispensing the droplets of electrostatically charged additive fluid from the electrostatic nozzle assembly; and adhering the droplets of electrostatically charged additive fluid with the one or more agricultural targets.

33. The method of treating one or more additive targets of claim 32, further comprising:

dispensing an agricultural product from an agricultural product nozzle assembly including:

delivering the agricultural product from an agricultural product source to an agricultural product nozzle; and subjecting the agricultural product to a modulating element including:

supplying the agricultural product though the modulating element; and reducing the profile of the agricultural product;

dispensing the agricultural product from the agricultural product nozzle assembly;

attracting the droplets of electrostatically charged fluid to the agricultural product; and adhering the droplets of electrostatically charged additive fluid to a portion of the agricultural product.

34. The method of treating the one or more additive targets of claim 32, wherein electrostatically charging the additive fluid includes:

subjecting the additive fluid to the electrostatically charging mechanism proximal to an orifice of the electrostatic nozzle assembly.

35. The method of treating the one or more agricultural targets of claim 32, further including adhering at least one droplet of electrostatically charged additive fluid with at least one droplet of agricultural product proximate to an orifice of the electrostatic nozzle.

36. The method of treating one or more additive targets of claim 32, further including:

dispensing agricultural product droplets with a larger profile than the droplets of electrostatically charged additive fluid.

37. The method of treating one or more additive targets of claim 32, further including:

applying a charge of between around 5,000 volts and 15,000 volts to the additive fluid.

* * * * *